(12) United States Patent
Shimada

(10) Patent No.: US 7,580,407 B2
(45) Date of Patent: Aug. 25, 2009

(54) METHOD AND APPARATUS FOR FORWARDING PACKET

(75) Inventor: Katsumi Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 11/784,027

(22) Filed: Apr. 5, 2007

(65) Prior Publication Data
US 2008/0075076 A1    Mar. 27, 2008

(30) Foreign Application Priority Data
Sep. 21, 2006    (JP)    .............................. 2006-256349

(51) Int. Cl.
H04L 12/28    (2006.01)
H04L 12/56    (2006.01)
(52) U.S. Cl. ....................... 370/389; 370/392; 370/474; 709/242
(58) Field of Classification Search ................. None
See application file for complete search history.

(56) References Cited

U.S. PATENT DOCUMENTS

| | | | | |
|---|---|---|---|---|
| 6,016,310 | A * | 1/2000 | Muller et al. ................ | 370/255 |
| 6,512,742 | B1 * | 1/2003 | Alexander et al. ........... | 370/231 |
| 6,553,029 | B1 * | 4/2003 | Alexander ................... | 370/389 |
| 6,567,403 | B1 * | 5/2003 | Congdon et al. ............. | 370/389 |
| 6,765,866 | B1 * | 7/2004 | Wyatt .......................... | 370/229 |
| 6,801,950 | B1 * | 10/2004 | O'Keeffe et al. ............. | 709/238 |
| 6,801,953 | B2 * | 10/2004 | Jennings et al. ............. | 709/250 |
| 7,251,217 | B2 * | 7/2007 | Wong et al. .................. | 370/232 |
| 7,414,985 | B1 * | 8/2008 | Tedijanto et al. ............. | 370/255 |
| 2003/0167346 | A1 * | 9/2003 | Craft et al. ................... | 709/250 |

FOREIGN PATENT DOCUMENTS
JP    2005-086668    3/2005

* cited by examiner

Primary Examiner—Hong Cho
Assistant Examiner—Robert C Scheibel
(74) Attorney, Agent, or Firm—Katten Muchin Rosenman LLP

(57) ABSTRACT

A packet forwarding apparatus has link aggregation capability and prevents the occurrence of flooding when forwarding a packet to a link of a trunk. The packet forwarding apparatus includes sections for learning the source address and a receiving path of the packet by learning information for identifying a port through which to receive the packet, a trunk of a link connected to the port, and a change in the receiving path of a packet received by the trunk, packet forwarding processing unit for, when a receiving path of packets having the same source address is changed in the trunk, selecting one link from among a plurality of links of the trunk in order to forward a packet having a destination address that is the same as the source address and forwarding the packet, and a learning requesting unit for requesting the performance of learning for the packet inside the packet forwarding apparatus.

16 Claims, 15 Drawing Sheets

FIG.6

| SOURCE ADDRESS | UNIT NUMBER | PORT NUMBER | TRUNK NUMBER | CHANGE FLAG | |
|---|---|---|---|---|---|
| 0A | U3 | p1 | 00 | 0 | F61 |
| 0E | U2 | p4 | 50 | 0 | F62 |
| 0E | U1 | p4 | 50 | 1 | F63 |
| 0E | U2 | p4 | 50 | 0 | F64 |

FIG.7

|    | LINE UNIT 11 |
|----|----|
| p1 | 0  |
| p2 | 0  |
| p3 | 0  |
| p4 | 50 |

|    | LINE UNIT 12 |
|----|----|
| p1 | 0  |
| p2 | 0  |
| p3 | 0  |
| p4 | 50 |

|    | LINE UNIT 13 |
|----|----|
| p1 | 0  |
| p2 | 0  |
| p3 | 0  |
| p4 | 0  |

FIG.9

| UNIT NUMBER | PORT NUMBER | PORT STATE |
|---|---|---|
| U1 | p1 | 1111 |
| U1 | p2 | 1111 |
| U1 | p3 | 1111 |
| U1 | p4 | 0000 |
| U2 | p1 | 1111 |
| U2 | p2 | 1111 |
| U2 | p3 | 1111 |
| U2 | p4 | 0000 |
| U3 | p1 | 1111 |
| U3 | p2 | 1111 |
| U3 | p3 | 1111 |
| U3 | p4 | 1111 |

FIG.10

| TRUNK NUMBER | NUMBER OF PORT | PORT NUMBER | | | |
|---|---|---|---|---|---|
| . . | . . | . . | | | |
| 50 | 2 | U1p4 | U2p4 | . . . | . . . |
| . . . | . . . | . . . | | | |

FIG.15

| SOURCE ADDRESS | VLAN-ID | UNIT NUMBER | PORT NUMBER | TRUNK NUMBER | CHANGE FLAG |

METHOD AND APPARATUS FOR FORWARDING PACKET

BACKGROUND OF THE INVENTION

1. Field of the Invention

The present invention relates to a method and apparatus for forwarding a packet and, in particular, to a method and apparatus for forwarding a packet and having a link aggregation capability that can increase a communication bandwidth by combining a plurality of links into one virtual logical link and prohibiting a packet received by a link having the link aggregation attribute from being forwarded to all of the links connected to the apparatus.

2. Description of the Related Art

A packet forwarding apparatus for forwarding a packet in accordance with a destination address of the packet has a capability of learning a forwarding path. The packet forwarding apparatus learns receiving positional information corresponding to a source address of the received packet. In general, the packet forwarding apparatus learns a number that identifies a port (i.e., a port number) as the receiving positional information. That is, the packet forwarding apparatus registers the latest receiving positional information for the source address of the received packet in a learning table. The packet forwarding apparatus determines the forwarding address on the basis of a destination address of the received packet using the learning table. If the packet forwarding apparatus searches the learning table and cannot find the corresponding information in the learning table, the packet forwarding apparatus forwards the packet to all of ports thereof, that is, all the ports other than the port from which the packet was received. This operation is referred to as "flooding".

The packet forwarding apparatus learns by receiving a packet generated by flooding and resisters the learned information in the learning table. However, in general, only some of the information items in the learning table registered by flooding are used. Most of the information items in the learning table are not used, and therefore, the resource of the learning table is wasted. Accordingly, the packet forwarding apparatus deletes the information items in the learning table that are not relearned in a predetermined time period. This operation is referred to as "aging".

For a packet forwarding apparatus having the link aggregation capability, even when one of the links packed using the link aggregation capability malfunctions, the packet forwarding apparatus can continue the operation thereof by using the other normal links. A link packed into one by the link aggregation function is referred to as a "trunk". When the packet forwarding apparatus receives a packet via a trunk, the learning information about the receiving position of the packet is not a port number, but a number that identifies the trunk (i.e., a trunk number). Accordingly, the packet forwarding apparatus generates a link aggregation table identifying ports packed into the trunk. That is, the link aggregation table including a correspondence between a port number and a trunk number is generated. Subsequently, if the receiving positional information corresponding to the destination address in the received packet indicates a trunk on the basis of the learning result, the packet forwarding apparatus selects one port from among the ports of the link aggregation on the basis of a predetermined computation and forwards the packet to that port. The port selected from among a plurality of links, i.e., a plurality of ports of the link aggregation for forwarding depends on the predetermined computation of the packet forwarding apparatus. Accordingly, when a terminal station communicates a packet with a server via a target packet forwarding apparatus having a link aggregation attribute, the forwarding path from the terminal station to the server may be different from the forwarding path from the server to the terminal station.

In a stackable packet forwarding apparatus in which line units are stackable to allow installation of additional ports, a learning table is provided for each line unit.

When the stackable packet forwarding apparatus forwards a packet via a link included in a trunk and the link used for transmitting a packet to the target apparatus is the same as the link used for receiving a packet from the target apparatus, the occurrence of flooding can be prevented. However, when the links for receiving and transmitting a packet are different and the link aggregation is set for a plurality of line units, a line unit of the packet forwarding apparatus that has received a packet destined for a server from a terminal station may not have received a packet destined for the terminal station from the server (i.e., another line unit has received that packet). In such a case, since a learning table is provided for each line unit and the information learned by each line unit is not relearned, aging occurs. Therefore, when the packet forwarding apparatus forwards the packet via a link of the trunk again, the flooding occurs.

When forwarding a packet via a link of a trunk and the link used for transmitting a packet to the target apparatus is the same as the link for receiving a packet from the target apparatus, the occurrence of flooding can be prevented. However, if the same link is used in the trunk as the selected link for receiving and transmitting and the link malfunctions, the packet forwarding apparatus cannot continue the communication by using another normal link.

To prevent the occurrence of flooding, Japanese Unexamined Patent Application Publication No. 2005-86668, for example, describes a technique in which information in learning tables of all of line units including links of link aggregation are set to be the same. More specifically, a learning packet is sent to the line units at predetermined timings. However, sending the learning packet disadvantageously reduces a use communication bandwidth of the packet forwarding apparatus. Furthermore, the configuration of the packet forwarding apparatus is complicated in order to generate the learning packet.

SUMMARY OF THE INVENTION

As noted above, in a packet forwarding apparatus having a link aggregation capability, when a packet is forwarded between two users (e.g., a terminal station and a server) via a link of a trunk, a link in a direction from the terminal station to the server may be different from a link in a direction from the server to the terminal station. In addition, different learning tables may be used for the links. For example, a line unit containing a link in a direction from the terminal station to the server may be different from a line unit containing a link in a direction from the server to the terminal station. In addition, these line units may manage different learning tables. In such a case, some of learning data items obtained by flooding is subject to aging since these data items are not relearned. Accordingly, when a packet is forwarded using the link of the trunk again, the flooding occurs.

Accordingly, it is an object of the present invention to provide a packet forwarding apparatus having a link aggregation capability and a packet forwarding method thereof capable of preventing the occurrence of flooding when forwarding a packet.

According to a first aspect of the present invention, a packet forwarding apparatus for forwarding a packet in accordance with a destination address using a trunk is provided in which the trunk combines a plurality of links connected to the packet forwarding apparatus into one link. The packet forwarding apparatus includes learning means for learning the source address and a receiving path of the packet by learning information for identifying a port through which to receive the packet, information for identifying a trunk of a link connected to the port, and information for identifying that the receiving path of a packet received by the trunk has been changed; packet forwarding means for, when a receiving path of packets having the same source address is changed in the trunk, selecting one link from among a plurality of links of the trunk in order to forward a packet having a destination address that is the same as the source address and forwarding the packet via the selected link; and learning requesting means for, when a receiving path of packets having the same source address is changed in the trunk, requesting the performance of learning for the packet having a destination address that is the same as the source address inside the packet forwarding apparatus.

In general, in packet forwarding apparatuses having a link aggregation capability, a link used for forwarding a packet may be changed to another link in the trunk. In this case, flooding may occur. According to the first aspect of the present invention, the packet forwarding apparatus can request performance of learning inside the packet forwarding apparatus so as to prevent the occurrence of flooding.

The packet forwarding apparatus can employ an intra-device frame header containing the information for identifying the trunk and information for requesting the performance of learning for the packet inside the packet forwarding apparatus and wherein the intra-device frame header is transferred together with the received packet transferred inside the packet forwarding apparatus.

In general, in packet forwarding apparatuses having a link aggregation capability, a link used for forwarding a packet may be changed to another link in the trunk. In this case, flooding may occur. According to the first aspect of the present invention, the packet forwarding apparatus can request performance of learning to another line unit in the packet forwarding apparatus so as to prevent the occurrence of flooding.

The packet forwarding apparatus can further include learning means for learning information for indicating whether the receiving path of packets having the same source address has been changed in the trunk a predetermined number of times or more, packet forwarding means for, when the receiving path has been changed the predetermined number of times or more, selecting one link from among a plurality of links of the trunk and forwarding the packet via the selected link, and learning requesting means for, when the receiving path has been changed the predetermined number of times or more, requesting the performance of learning for the packet inside the packet forwarding apparatus.

In general, in packet forwarding apparatuses having a link aggregation capability, a link used for forwarding a packet may be changed to another link in the trunk a predetermined number of times or more. In this case, flooding may occur. According to the first aspect of the present invention, the packet forwarding apparatus can request performance of learning inside the packet forwarding apparatus so as to prevent the occurrence of flooding.

According to a second aspect of the present invention, a packet forwarding apparatus for forwarding a packet in accordance with a destination address using a trunk is provided in which the trunk combines a plurality of links connected to the packet forwarding apparatus into one link. The packet forwarding apparatus includes at least one line unit including a plurality of ports, a learning table, a packet forwarding processing unit, and a learning request unit; a setting control unit for controlling the at least one line unit to set a plurality of links forming the trunk; and an intra-device interface unit for connecting the line unit with the setting control unit. Learning results of information for identifying the port through which to receive the packet, information for identifying a trunk of a link connected to the port, and information for identifying that the receiving path of a packet received by the trunk has been changed are registered in the learning table. When the receiving path of packets having the same source address is changed in the trunk, the packet forwarding processing unit selects one link from among a plurality of links of the trunk in order to forward a packet having a destination address that is the same as the source address and forwards the packet via the selected link, and, when a receiving path of packets having the same source address is changed in the trunk, the learning requesting unit requests the performance of learning for the packet having a destination address that is the same as the source address inside the packet forwarding apparatus.

In general, in packet forwarding apparatuses having a link aggregation capability and including expandable line units, a link used for forwarding a packet may be changed to another link in the trunk. In this case, flooding may occur. According to the second aspect of the present invention, the packet forwarding apparatus can request performance of learning to a learning table of each of the relevant line units so as to prevent the occurrence of flooding.

According to a third aspect of the present invention, a method for forwarding a packet in accordance with a destination address using a trunk is provided in which the trunk combines a plurality of links connected to a packet forwarding apparatus into one link. The method includes the steps of learning the source address and a receiving path of the packet by learning information for identifying a port through which to receive the packet, information for identifying a trunk of a link connected to the port, and information for identifying that the receiving path of a packet received by the trunk has been changed; when a receiving path of packets having the same source address is changed in the trunk, selecting one link from among a plurality of links of the trunk in order to forward a packet having a destination address that is the same as the source address and forwarding the packet via the selected link; and, when a receiving path of packets having the same source address is changed in the trunk, requesting the performance of learning for the packet having a destination address that is the same as the source address inside the packet forwarding apparatus.

In general, in packet forwarding methods having a link aggregation capability, a link used for forwarding a packet may be changed to another link in the trunk. In this case, flooding may occur. According to the third aspect of the present invention, the packet forwarding method can request performance of learning to the packet forwarding apparatus so as to prevent the occurrence of flooding.

According to the present invention, in a packet forwarding apparatus having a link aggregation capability and expandable line units each including a learning table, when a link used for forwarding a packet is changed to another link in a trunk, the packet forwarding apparatus can request the performance of learning to the relevant line units so as to prevent the occurrence of flooding.

BRIEF DESCRIPTION OF THE DRAWINGS

FIG. 6 illustrates a first exemplary structure of a learning table;

FIG. 7 illustrates an exemplary structure of a trunk number table;

FIG. 9 illustrates an exemplary structure of a port state table;

FIG. 10 illustrates an exemplary structure of a trunk member table;

FIG. 15 illustrates a second exemplary structure of the learning table.

DESCRIPTION OF THE PREFERRED EMBODIMENTS

Figure 1:
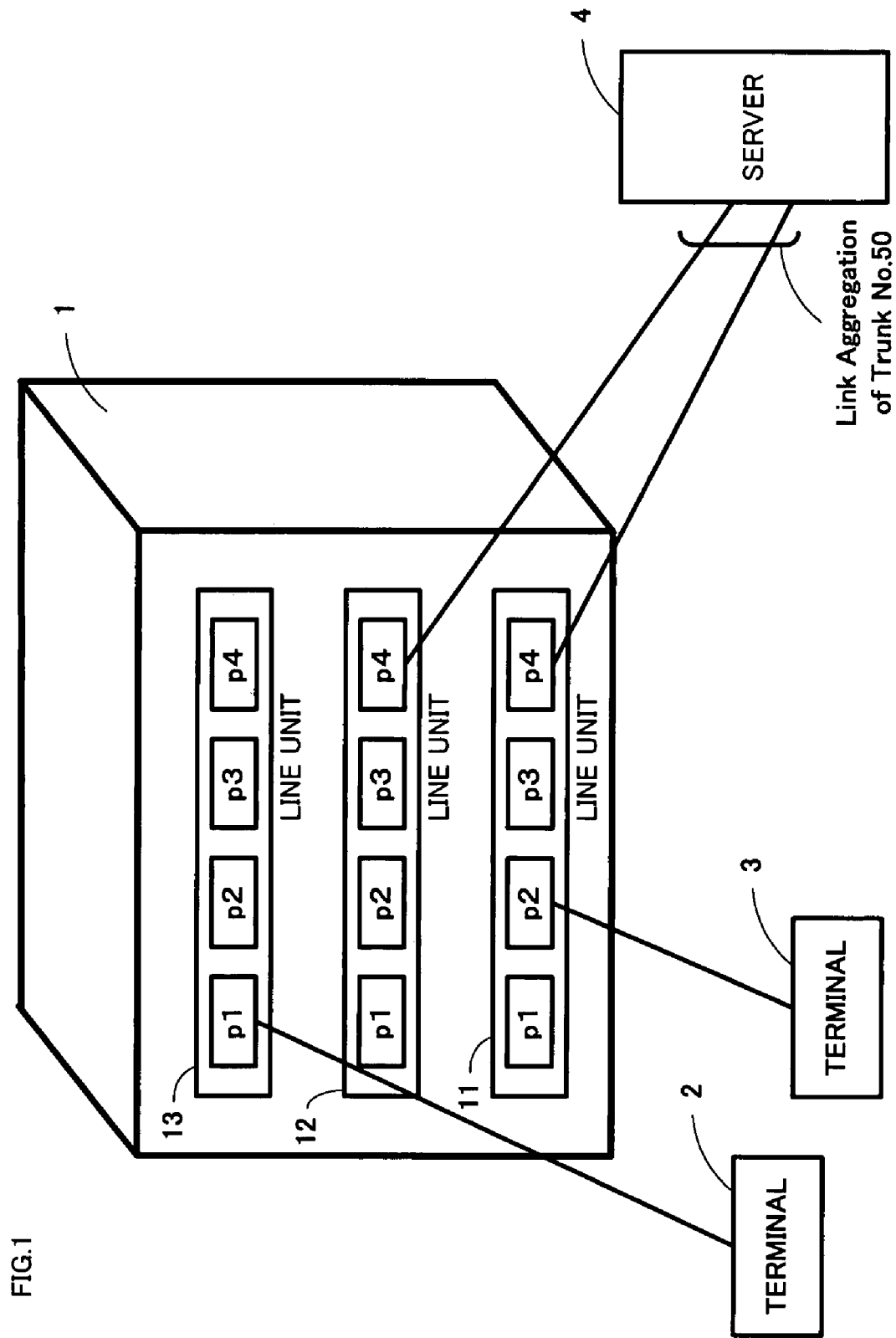
FIG. 1 is a diagram illustrating an L2 switch.

Embodiments of the present invention are described in detail below with reference to the accompanying drawings. Note that, in the drawings, the same components or similar components are designated using the same reference numerals. Additionally, the following embodiments are described with reference to a case where a packet forwarding apparatus according to the present invention is applied to a layer-2 switch (an L2 switch) of a stackable type. However, the packet forwarding apparatus according to the present invention is not limited to an L2 switch of a stackable type.

First Embodiment

FIG. 1 is a diagram illustrating an L2 switch 1. A terminal 2 is connected to a port p1 of a line unit 13 of the L2 switch 1. A terminal 3 is connected to a port p2 of a line unit 11 of the L2 switch 1. A server 4 is connected to a port p4 of the line unit 11 and a port p4 of a line unit 12 of the L2 switch 1. These two ports p4 are included in a trunk having a trunk number 50. That is, the port p4 of the line unit 11 and the port p4 of the line unit 12 are part of the same link aggregation.

Figure 2:
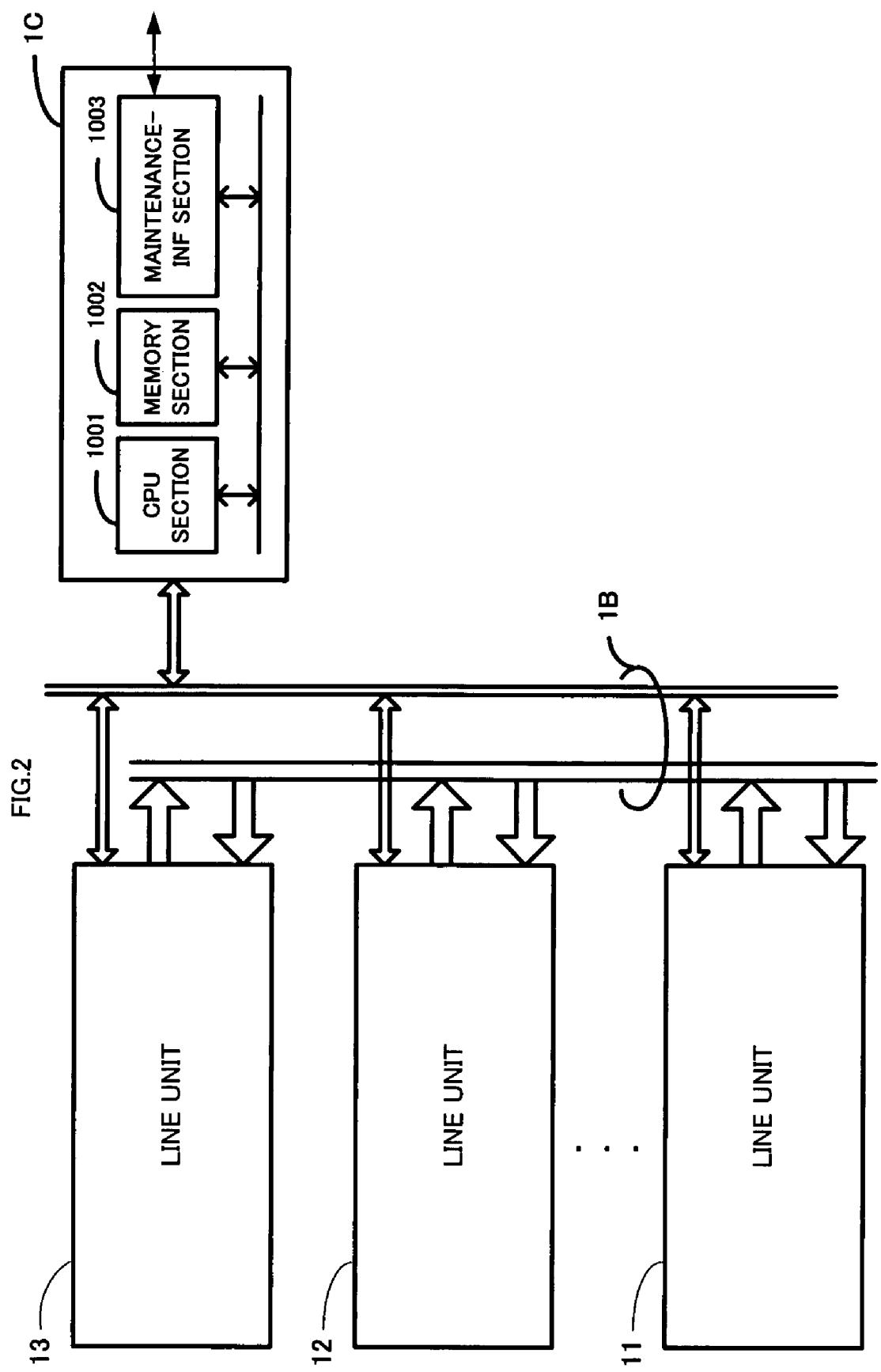
FIG. 2 illustrates an exemplary structure of the L2 switch.

FIG. 2 illustrates an exemplary structure of the L2 switch 1. The L2 switch 1 includes a setting control unit 1C, line units 11, 12, and 13, and a back wiring board (back board) 1B. The term "line units 10" collectively refers to the line units 11, 12, and 13. The back board 1B connects the line units 10 to the setting control unit 1C. The setting control unit 1C includes a central processing unit (CPU) section 1001, a memory section 1002, and a maintenance interface section 1003. The setting control unit 1C sets maintenance data in the line units 10, monitors status data of the line units 10, and controls the state transition of the line units 10 using a signal via the back board 1B. The CPU section 1001 sets data for maintenance received from an external apparatus (not shown) in the line units 10. In addition, the CPU section 1001 controls processing of data for monitoring the states of the line units 10. The memory section 1002 stores control software used by the CPU section 1001, data to be set in the line units 10, and monitored data of the line units 10. The maintenance interface section 1003 includes an interface with an external apparatus for maintenance so as to transmit and receive a variety of setting data and monitored data. The CPU section 1001, the memory section 1002, and the maintenance interface section 1003 are connected to each other in the setting control unit 1C. The setting control unit 1C is connected to the line units 10 via the back board 1B. Each of the line units 10 transmits and receives a forwarding packet to and from the other line units 10 via the back board 1B. The line units 10 are expandable in accordance with the number of links and the transfer speeds of the links contained in the L2 switch 1.

Figure 3:
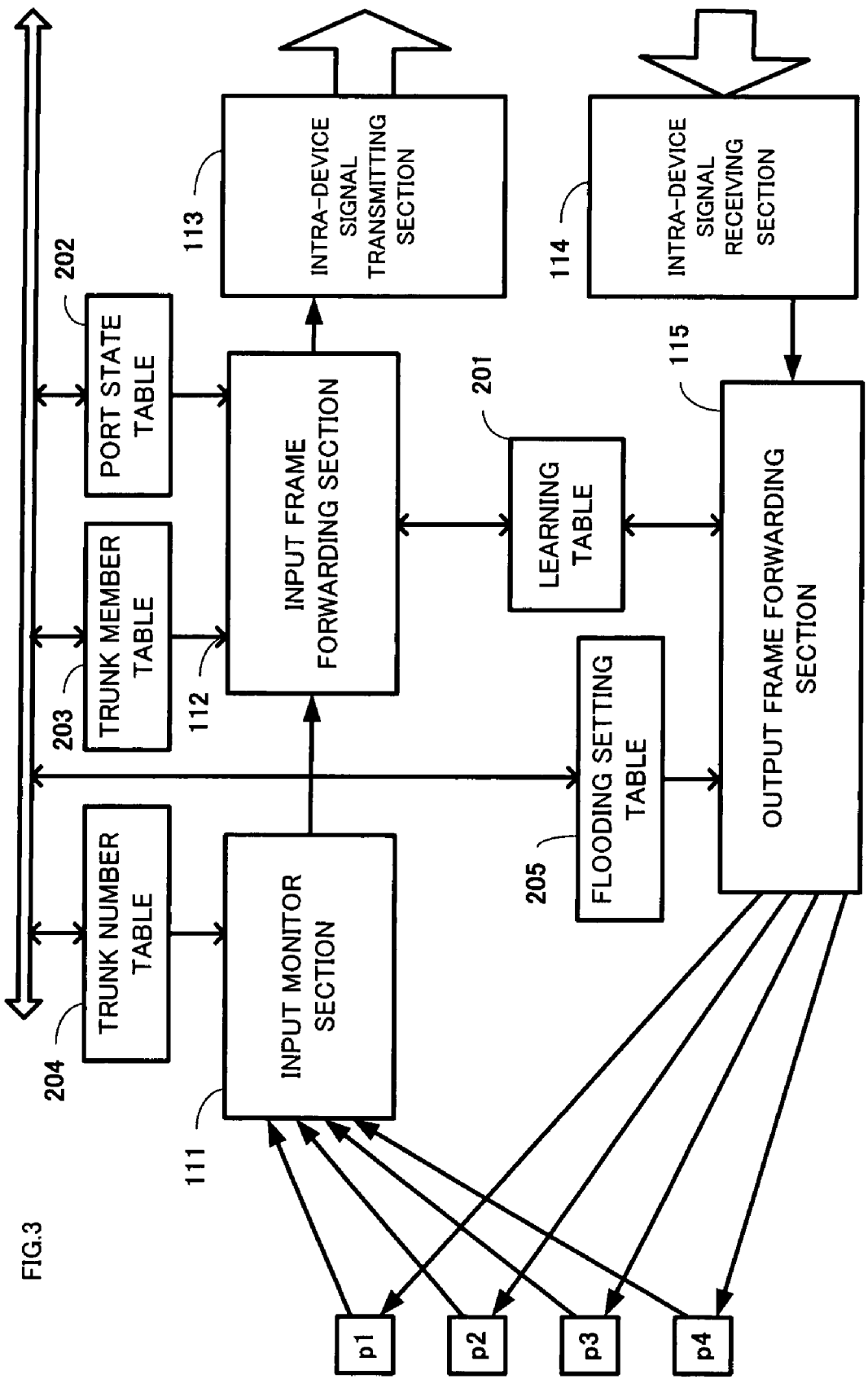
FIG. 3 illustrates an exemplary configuration of a line unit.

FIG. 3 illustrates an exemplary configuration of the line unit 10. The line unit 10 includes the four Ethernet (trade name) ports p1, p2, p3, and p4. The line unit 10 further includes an input monitor section 111, an input frame forwarding section 112, an intra-device signal transmitting section 113, an intra-device signal receiving section 114, and an output frame forwarding section 115. The input monitor section 111 monitors the validity of a received frame. The input frame forwarding section 112 determines the forwarding destination of the frame and adds an intra-device frame header, which is information transferred between the line units 10, to the frame. The intra-device signal transmitting section 113 transmits the frame having the intra-device frame header to another line unit. The intra-device signal receiving section 114 receives a frame having the intra-device frame header and determines whether the frame is destined for its own line unit. The output frame forwarding section 115 performs a learning operation on the received frame and forwards the frame to the corresponding port. The line unit 10 further includes a learning table 201, a trunk number table 204, a flooding setting table 205, a port state table 202, and a trunk member table 203, which are illustrated in FIGS. 6 to 10, respectively. The line unit 10 is described in detail below after descriptions referring to FIGS. 6 to 10 are completed.

Figure 4:
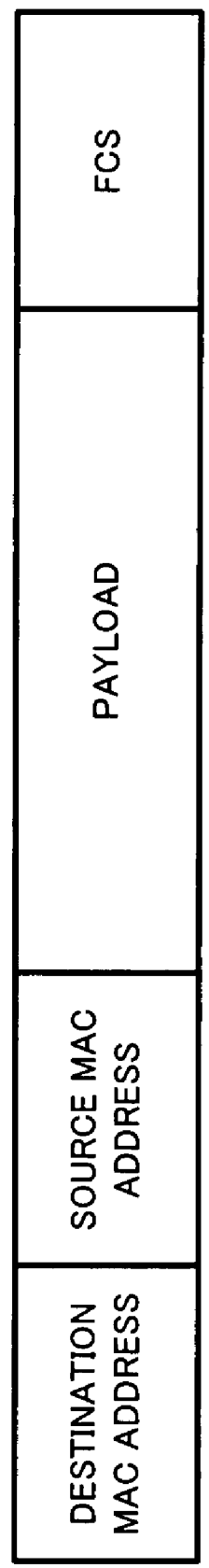
FIG. 4 illustrates a MAC frame format.

FIG. 4 illustrates a MAC frame format. The MAC frame (hereinafter simply referred to as a "frame") includes a destination MAC address (hereinafter simply referred to as a "destination address") for specifying the destination, a source MAC address (hereinafter simply referred to as a "source address") for specifying the source, a payload which is a field containing transmission data, and a frame check sequence (FCS) used for detecting a frame transmission error.

In the present embodiment, the address of the terminal 2 is referred to as an "0A", the address of the terminal 3 is referred to as an "0B", and the address of the server 4 is referred to as an "0E".

Figure 5:
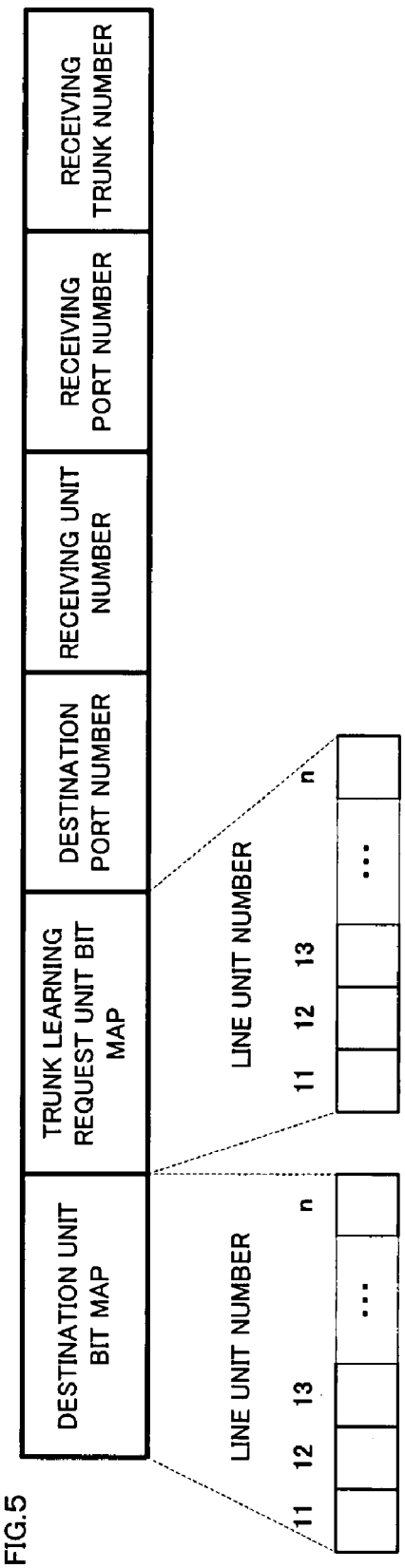
FIG. 5 illustrates a first exemplary structure of an intra-device frame header.

FIG. 5 illustrates a first exemplary structure of the intra-device frame header. The intra-device frame header includes a destination unit bitmap used as a unit identifier of the destination, a trunk learning request unit bitmap used as a unit identifier of a target of trunk learning, a destination port number used as an output port identifier, a receiving unit number used as a receiving unit identifier, a receiving port number used as a receiving port identifier, and a receiving trunk number used as a receiving trunk identifier. The destination unit bitmap and the trunk learning request unit bitmap are configured in accordance with the line unit 10 included in the L2 switch 1. That is, the destination unit bitmap indicates, using the bit position, a destination line unit of the frame to which the intra-device frame header is attached. The trunk learning request unit bitmap indicates, using the bit position, a line unit to which a learning operation is requested in terms of the frame to which the intra-device frame header is attached. For the two bitmaps, by setting a bit corresponding to the target line unit 10 to a logical level "1", the desired line unit is selected. The destination port number indicates a destination port of the frame. When flooding is performed for all of the ports, the destination port number is set to "00". Examples F51 to F56 indicate particular information in the intra-device frame header in accordance with a transmission sequence of a frame performed between the terminal 2 and the server 4. The examples F51 to F56 will be described in more detail below.

FIG. 6 illustrates a first exemplary structure of the learning table 201. Each of the line units 10 has the learning table 201. The learning table 201 includes a source address, a unit number, a port number, a trunk number, and a change flag. That is, for each source address of the received frame, the learning table 201 includes the unit number for identifying the line unit 10 that has received the frame and the port number for identifying a port that has received the frame. If the port is part of an link aggregation, the learning table 201 further includes the trunk number for identifying the link aggregation and the change flag. The change flag is set to a logical level "1" when the number of changes in a port for receiving frames having the same source address exceeds a threshold value. Examples F61 to F64 indicate the information in the learning table 201 in accordance with a transmission sequence of a frame performed between the terminal 2 and the server 4.

FIG. 7 illustrates an exemplary structure of the trunk number table 204. Each of the line units 10 has the trunk number table 204. The trunk number table 204 is used for the input monitor section 111 to determine whether the port that has received a frame is part of a link aggregation. If the port that has received a frame is part of a link aggregation, the trunk number table 204 is used for referencing a trunk number for identifying the link aggregation. More specifically, the trunk number table 204 indicates, for each of the ports of the line unit 10, the information about whether the port is part of a link aggregation. If the port is part of a link aggregation, the trunk number table 204 further includes the trunk number of the link aggregation. In the present embodiment shown in FIG. 1, since the port p4 of the line unit 11 and the port p4 of the line unit 12 are part of the same link aggregation having a trunk number "50", the trunk number "50" is set for the port p4 of the line unit 11 and the port p4 of the line unit 12 whereas a value "0" for indicating that the port is not part of the link aggregation is set for the other ports.

Figure 8:
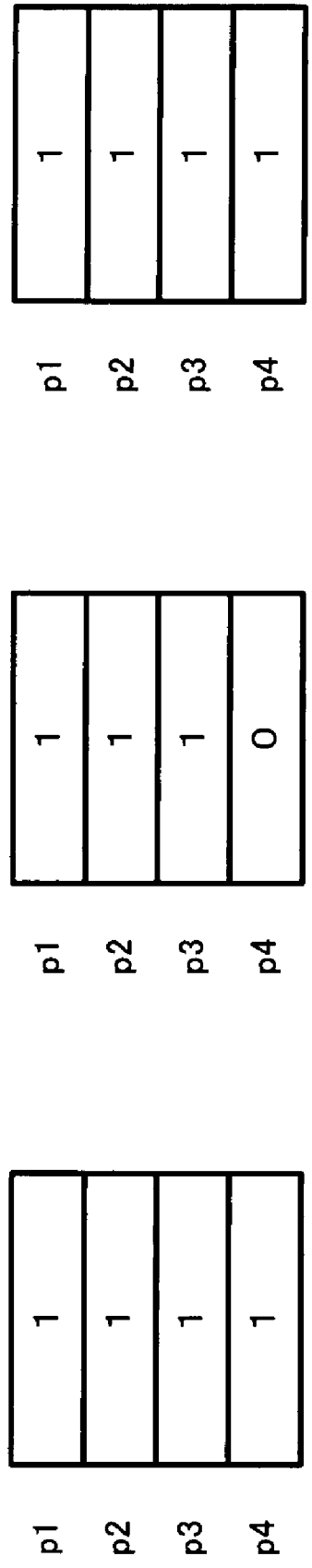
FIG. 8 illustrates an exemplary structure of a flooding setting table.

FIG. 8 illustrates an exemplary structure of the flooding setting table 205. Each of the line units 10 has the flooding setting table 205. The flooding setting table 205 is used for the output frame forwarding section 115 to determine a port to be subject to flooding. The ports other than the ports that are part of a link aggregation are set to a logical level "1". A port having a logical level "1" is a port used for forwarding a frame when flooding is performed. Additionally, the ports that are part of the link aggregation are set to a logical level "0". The ports having a logical level "0" are not used for forwarding a frame when flooding is performed. By referencing this table and determining which ports are used for flooding, the frame to be flooded is forwarded from only one port. In this way, the destination apparatus does not receive multiple frames to be flooded. In the present embodiment, the port p4 of the line unit 11 and the port p4 of the line unit 12 are part of a link aggregation having the same trunk number. As shown in FIG. 8, a frame to be flooded is transmitted to the port p4 of the line unit 11, but not to the port p4 of the line unit 12.

FIG. 9 illustrates an exemplary structure of the port state table 202. Each of the line units 10 has the port state table 202. The port state table 202 is used for the input frame forwarding section 112 to determine whether a port to which a frame is forwarded is part of a link aggregation. If the port to which a frame is forwarded is part of a link aggregation, the port state table 202 is used for determining whether a link connected to the port to which a frame is forwarded is available. The port state table 202 includes a unit number, a port number, and a port state. In the port state table 202, a port that is not part of a link aggregation is set to "1111", a port that is part of a link aggregation and has a normal port state is set to "0000", and a port that is part of a link aggregation and has an abnormal port state is set to "0001". In the present embodiment, the port p4 of the line unit 11 (U1) and the port p4 of the line unit 12 (U2) are part of the same link aggregation and the both ports have a normal port state.

FIG. 10 illustrates an exemplary structure of the trunk member table 203. Each of the line units 10 has the trunk member table 203. When the port for the destination of a frame is part of a link aggregation, the input frame forwarding section 112 references the trunk member table 203 to identify the ports of the link aggregation. The trunk member table 203 includes, for a trunk number serving as an identifier of the link aggregation, the number of ports in the link aggregation and a pair consisting of the positional information (i.e., the unit number) about a port in the link aggregation and the port number. In the present embodiment, the number of ports is two for the trunk having the trunk number "50". The port p4 of the line unit 11 (U1$p$4) and the port p4 of the line unit 12 (U2$p$4) form the link aggregation.

The line unit 10 shown in FIG. 3 is described in detail next.

A frame received by, for example, the port p1 is terminated by the input monitor section 111. The input monitor section 111 monitors whether the frame is normal. If the received frame is not normal, the input monitor section 111 discards the frame. If the received frame is normal, the input monitor section 111 performs the following processing.

The input monitor section 111 references the trunk number table 204 shown in FIG. 7, that is, a value in the table corresponding to the target port. If the value is "0", the target port is not part of a link aggregation. Therefore, the input monitor section 111 sets a value "00" in the receiving trunk number field in the intra-device frame header shown in FIG. 5. However, if the value in the trunk number table 204 is a value other than "0", the target port is part of a link aggregation. Since the number in the trunk number table 204 represents the trunk number, the input monitor section 111 sets that trunk number in the receiving trunk number field in the intra-device frame header.

The input monitor section 111 sets a unit number that identifies its own line unit, a port number that identifies a port that has received the frame, and the above-described trunk number in the receiving unit number, a receiving port number, and receiving trunk number in the intra-device frame header, respectively. Subsequently, the input monitor section 111 attaches this intra-device frame header to the received frame. The input monitor section 111 then transmits the frame to the input frame forwarding section 112.

Upon receiving the frame having the intra-device frame header, the input frame forwarding section 112 searches for the source address in the learning table 201 shown in FIG. 6 on the basis of a media access control (MAC) address (a destination address) so as to obtain the corresponding unit number, port number, trunk number, and change flag. Thereafter, in the port state table 202 shown in FIG. 9, the input frame forwarding section 112 references the port state of a port indicated by the unit number and the port number in the added intra-device frame header. Subsequently, in the trunk member table 203 shown in FIG. 10, the input frame forwarding section 112 references the port number that is part of the trunk indicated by the trunk number referenced in the learning table 201.

The input frame forwarding section 112 sets the unit number and the port number referenced in the learning table 201 to the destination unit bitmap and the destination port number in the intra-device frame header attached to the received frame, respectively. Thereafter, the input frame forwarding section 112 transmits the frame to the intra-device signal transmitting section 113.

The intra-device signal transmitting section 113 receives the frame having the attached intra-device frame header from the input frame forwarding section 112 and transmits the frame to the back board 1B.

The intra-device signal receiving section 114 receives the frame having the attached intra-device frame header from the back board 1B. The intra-device signal receiving section 114 then references the destination unit bitmap in the received intra-device frame header. If the bit for the line unit number corresponding to the its own line unit has a logical level "1", the intra-device signal receiving section 114 transfers the frame to the output frame forwarding section 115. However, if this bit has a logical level "0", the intra-device signal receiving section 114 discards the frame.

The output frame forwarding section 115 searches the learning table 201 using the source address contained in the transferred frame so as to start learning. As used herein, the term "learning" refers to memorizing a correspondence between the source address contained in the frame and a port that has received the frame. The output frame forwarding section 115 searches the learning table 201 using the destination address in the transferred frame as a search key. As a result of the search operation, if flooding is required, the output frame forwarding section 115 transfers the frame to the corresponding ports on the basis of the flooding setting table 205.

Note that the port state table 202, the trunk member table 203, the trunk number table 204, and the flooding setting table 205 are controlled by the setting control unit 1C described with reference to FIG. 2. The setting control unit 1C sets information in these tables.

Figure 11:
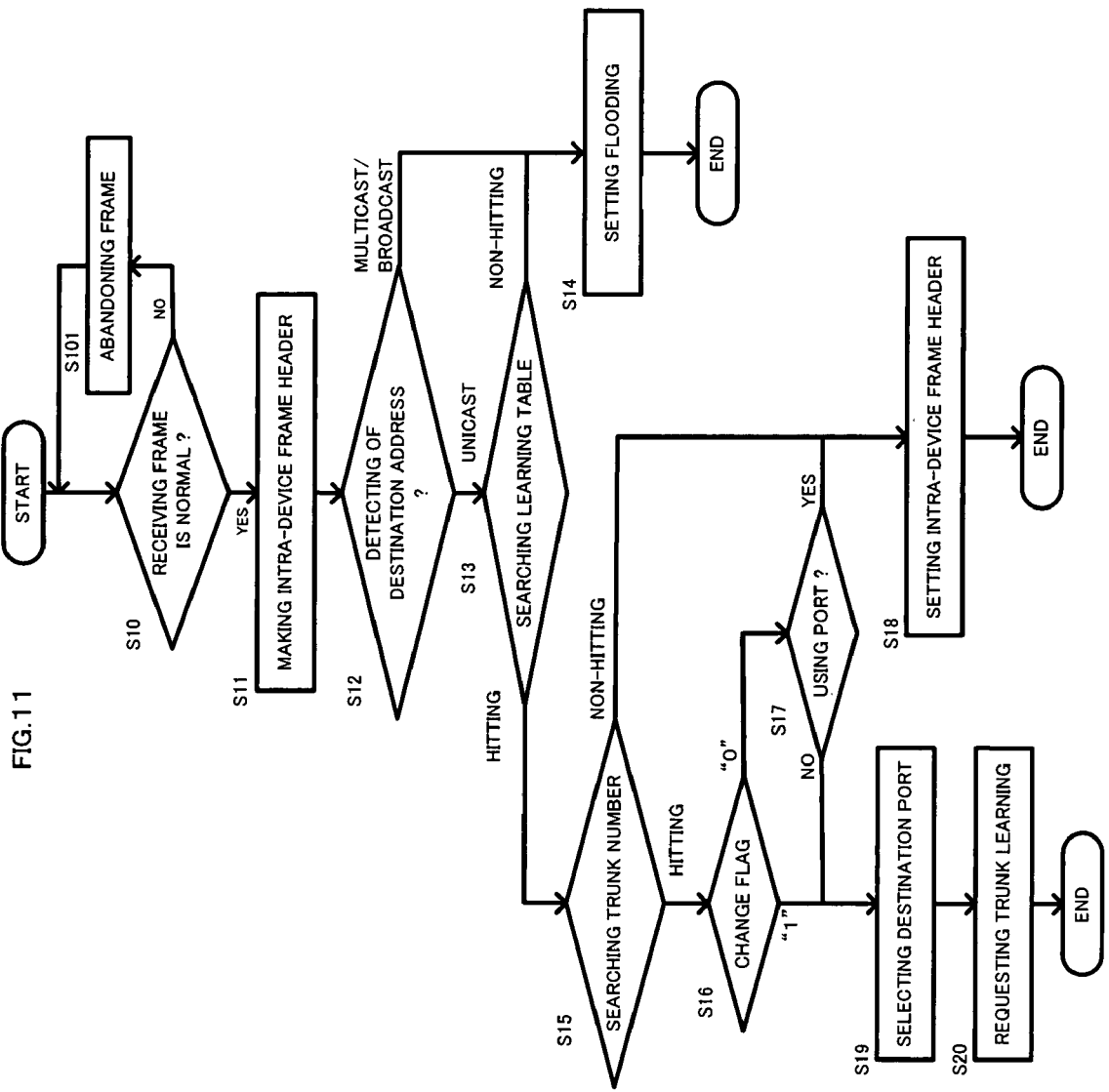
FIG. 11 is a flow chart illustrating an exemplary procedure of a process of receiving a frame performed by the L2 switch.

FIG. 11 is a flow chart illustrating the procedure of a reception process of a frame performed by the L2 switch 1. The process of receiving a frame via a port performed by the L2 switch 1, the processing of the frame performed by the input monitor section 111 and the input frame forwarding section 112, and the process of transferring the frame having an attached intra-device frame header to the back board 1B via the intra-device signal transmitting section 113 are illustrated in FIG. 11.

At step S10, it is determined whether the received frame is normal. If the received frame is abnormal, the process proceeds to step S101. However, if the received frame is normal, the process proceeds to step S1.

At step S101, the received frame is discarded.

At step S11, an intra-device frame header is generated in which the unit number of a unit having a port that has received the frame and the port number of the port are set in the receiving unit number field and the receiving port number field, respectively. To determine whether the port is part of a link aggregation, the input monitor section 111 references the trunk number table 204 of its own line unit. If the port is part of a link aggregation, that is, if the corresponding port in the trunk number table 204 contains a trunk number other than a value "0", the trunk number of the port is set in the receiving trunk number field. However, if the port is not part of a link aggregation, that is, if the corresponding port in the trunk number table 204 contains a trunk number "0", the value of, for example, "00" is set in the receiving trunk number field as an identifier. In this way, the intra-device frame header is generated.

At step S12, the input frame forwarding section 112 references the destination address in the received frame to determine whether a unicast data transfer in which data is transferred to one destination address or a multicast/broadcast data transfer in which data is transferred to a plurality of destination addresses is required.

At step S13, the input frame forwarding section 112 searches the learning table 201 using the destination address in the received frame as a search key.

If, at step S12, it is determined that a multicast/broadcast data transfer is required for the received frame or if, at step S13, the destination address of the received frame is not found in the learning table 201, the process proceeds to step S14.

At step S14, the input frame forwarding section 112 sets information indicating that the received frame is subjected to flooding in the intra-device frame header. That is, the input frame forwarding section 112 sets the destination port number in the intra-device frame header to "00". In addition, the input frame forwarding section 112 sets the bits in the destination unit bitmap corresponding to all of the line units 10 installed in the L2 switch 1 to "1"s.

If, at step S13, the destination address in the received frame is found in the learning table 201, the process proceeds to step S15.

At step S15, the input frame forwarding section 112 references the trunk number registered in the learning table 201 to determine whether the trunk number is learned in the learning table 201. That is, the input frame forwarding section 112 determines whether the trunk number is registered or a value "00" that indicates no registration is registered.

If, at step S15, the trunk number is registered in the learning table 201, that is, if a port used for forwarding the received frame is part of a link aggregation, the process proceeds to step S16.

At step S16, the input frame forwarding section 112 references the change flag registered in the learning table 201 to determine whether the port for the destination address is changed to another one among the ports of the link aggregation as a port for receiving a frame from the same source address, that is, whether the change flag is set to a logical level "1".

If, at step S16, it is determined that the change flag of the trunk is set to a logical level "0", that is, if the port for the destination address is not changed to another one among the ports of the link aggregation, the process proceeds to step S17.

At step S17, the input frame forwarding section 112 references the port state table 202 to determine whether the port for the destination address is a target of the link aggregation. If the port for the destination address is a target of the link aggregation, the input frame forwarding section 112 determines whether the port is available.

If, at step S15, it is determined that the port for the destination address of the received frame is not part of a link aggregation or if, at step S17, the port for the destination address is available, the process proceeds to step S18. That is, if the port for the destination address of the received frame is not part of a link aggregation or if the port is part of a link aggregation and the port is available, the process proceeds to step S18.

At step S18, in addition to the intra-device frame header generated at step S11, the input frame forwarding section 112 sets the unit number and the port number referenced in the learning table 201 to the destination unit bitmap and the destination port number in the intra-device frame header to generate an intra-device frame header. The input frame forwarding section 112 then attaches the generated intra-device frame header to the frame. The frame is transmitted to the back board 1B.

If, at step S16, it is determined that the change flag of the trunk is set to a logical level "1", or if, at step S17, the port for the destination address is unavailable, that is, if the port is part of the link aggregation, but the port is unavailable, the process proceeds to step S19.

At step S19, the input frame forwarding section 112 references the trunk member table 203 and selects a port for the destination address from among the ports of a link aggregation corresponding to the trunk number referenced at step S15. Subsequently, the input frame forwarding section 112 generates an intra-device frame header in which the unit number and the port number of the port are set in the destination, unit bitmap and the destination port number, respectively.

At step S20, the input frame forwarding section 112 references the trunk member table 203 to find all of the line units 10 having the ports of the link aggregation corresponding to the trunk. Thereafter, the input frame forwarding section 112 generates an intra-device frame header in which the corresponding bits in the trunk learning request unit bitmap are set to a logical level "1". The input frame forwarding section 112 then adds the destination unit bitmap and the destination port number generated at step S19 and the trunk learning request unit bitmap generated at this step (S20) to the intra-device frame header generated at step S11. The input frame forwarding section 112 attaches this intra-device frame header to the frame and the intra-device signal transmitting section 113 transmits the frame having the intra-device frame header to the back board 1B.

Figure 12:
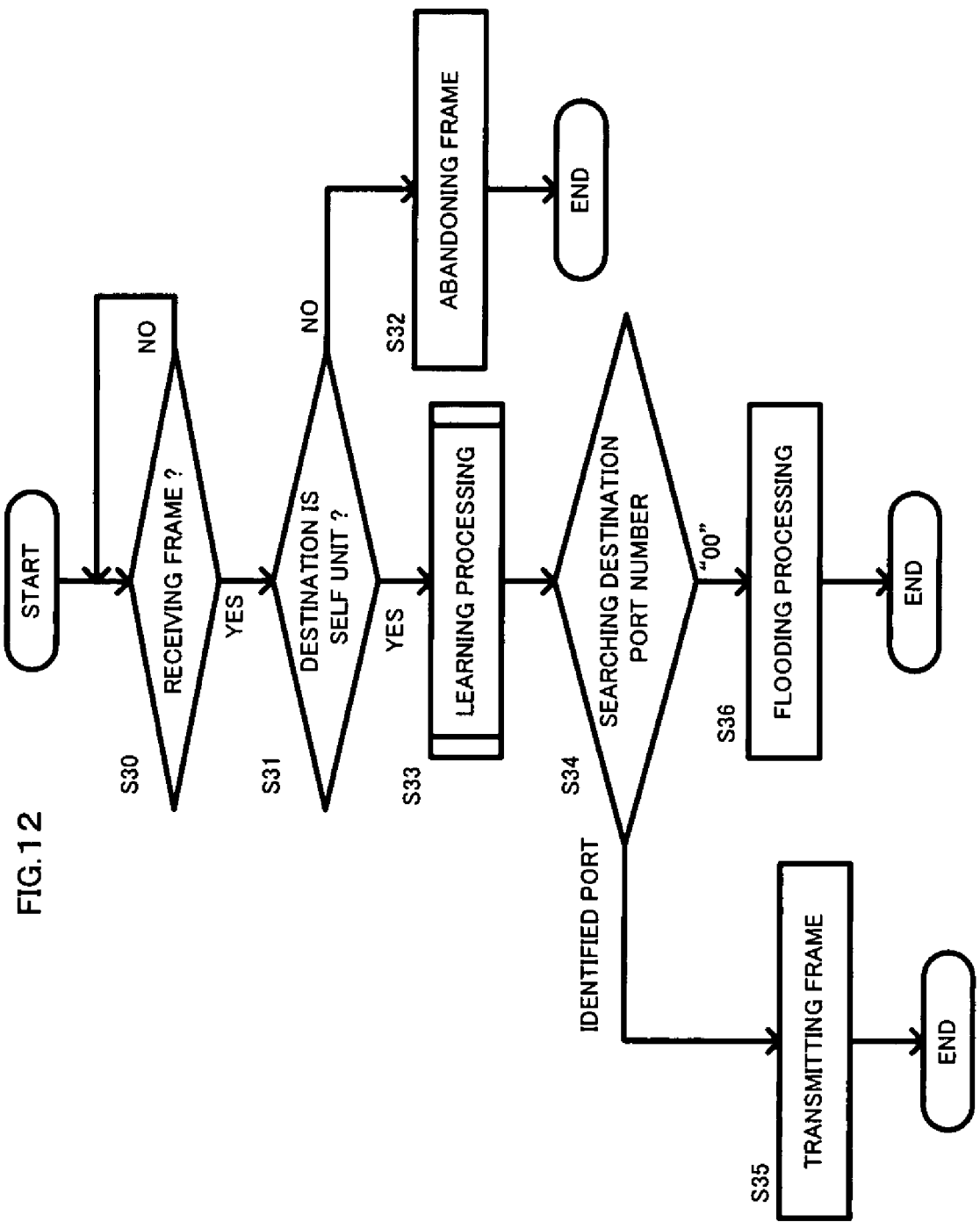
FIG. 12 is a flow chart illustrating an exemplary procedure of a process of transmitting a frame performed by the L2 switch.

FIG. 12 is a flow chart illustrating the procedure of transmitting the frame performed by the L2 switch 1. The process of receiving the frame having the intra-device frame header from the back board 1B performed by the intra-device signal receiving section 114 of the L2 switch 1 and the process of the frame performed by the output frame forwarding section 115, and the process of forwarding the frame via a port performed by the output frame forwarding section 115 are illustrated in FIG. 12.

At step S30, the intra-device signal receiving section 114 receives the frame having the intra-device frame header from the back board 1B.

At step S31, the output frame forwarding section 115 determines whether the received frame is destined for its own line unit 10 on the basis of the destination unit bitmap in the intra-device frame header of the received frame. Alternatively, the output frame forwarding section 115 determines whether the received frame indicates a learning request to its own line unit 10 on the basis of the trunk learning request unit bitmap in the intra-device frame header of the received frame.

If, at step S31, it is determined that the received frame is not destined to its own line unit 10, the process proceeds to step S32.

At step S32, the output frame forwarding section 115 discards the received frame having the intra-device frame header.

If, at step S31, it is determined that the received frame is destined for its own line unit 10, the process proceeds to step S33.

At step S33, a learning process is performed. The learning process is described in detail below with reference to FIG. 13.

If, at step S31, it is determined, on the basis of the destination unit bitmap in the intra-device frame header of the received frame, that the received frame is destined for its own line unit 10 and the learning process is performed at step S33, the process proceeds to step S34.

At step S34, the output frame forwarding section 115 determines whether the destination port number in the intra-device frame header indicates a specific port number, that is, whether the destination port number is "00" or a port number corresponding to a specific port.

If, at step S34, it is determined that the destination port number in the intra-device frame header indicates a specific port number, the process proceeds to step S35.

At step S35, the output frame forwarding section 115 forwards the frame to only a port of the destination port number.

If, at step S34, it is determined that the destination port number in the intra-device frame header is "00", that is, if it is determined that a flooding transmission is instructed, the process proceeds to step S36.

At step S36, the output frame forwarding section 115 forwards the frame to all of the ports having the corresponding bits in the flooding setting table 205 set to a logical level "1".

Note that the intra-device frame header attached to the frame is removed and discarded at step S35 or S36.

Figure 13:
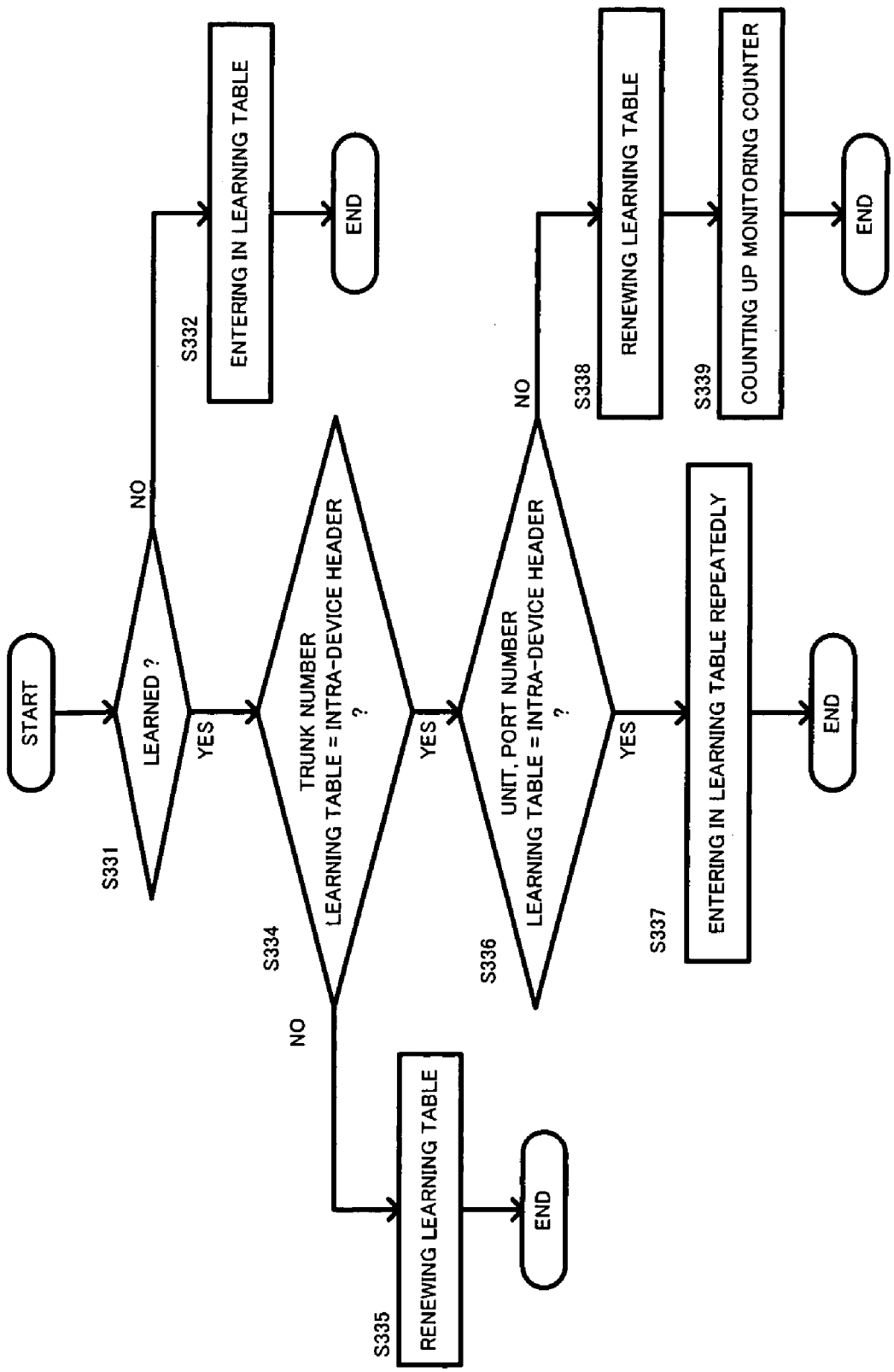
FIG. 13 is a flow chart illustrating an exemplary procedure of a learning process performed by the L2 switch.

FIG. 13 is a flow chart illustrating the procedure of the learning process performed by the L2 switch 1. The learning process contained in the frame transmitting process shown in FIG. 12 is illustrated in FIG. 13.

At step S331, the L2 switch 1 searches the learning table 201 using the source address of the frame as a search key.

If, at step S331, a learning process for the source address of the frame has not been performed, that is, if data for the source address of the frame is not found in the learning table 201, the process proceeds to step S332.

At step S332, the L2 switch 1 registers the receiving unit number, the receiving port number, and the receiving trunk number contained in the intra-device frame header in the unit number, the port number, and the trunk number of the learning table 201, respectively.

If, at step S331, a learning process for the source address of the frame has been performed, the process proceeds to step S334.

At step S334, the L2 switch 1 reads out the learning data on the basis of the source address to determine whether the trunk number registered in the learning table 201 is equal to the receiving trunk number contained in the intra-device frame header.

If, at step S334, it is determined that the trunk number registered in the learning table 201 is different from the receiving trunk number contained in the intra-device frame header or if it is determined that the trunk number is "00" which indicates that the trunk number is not registered, the process proceeds to step S335.

At step S335, the L2 switch 1 updates the data (i.e., the unit number, the port number, and the trunk number) registered in the learning table 201 to the receiving unit number, the receiving port number, and the receiving trunk number contained in the intra-device frame header, respectively, on the basis of the source address. That is, the L2 switch 1 performs relearning.

If, at step S334, it is determined that the trunk number registered in the learning table 201 is equal to the receiving trunk number contained in the intra-device frame header, the process proceeds to step S336.

At step S336, it is determined whether the unit number and the port number registered in the learning table 201 are equal to the receiving unit number and the receiving port number contained in the intra-device frame header, respectively, on the basis of the source address.

If, at step S336, it is determined that the unit number and the port number registered in the learning table 201 are equal to the receiving unit number and the receiving port number contained in the intra-device frame header, respectively, the process proceeds to step S337.

At step S337, the L2 switch 1 overwrites the receiving unit number, the receiving port number, and the receiving trunk number contained in the intra-device frame header to the data (i.e., the unit number, the port number, and the trunk number) registered in the learning table 201, respectively, on the basis of the source address. That is, the L2 switch 1 performs relearning.

If, at step S336, it is determined that either the unit number registered in the learning table 201 is different from the receiving unit number or the port number registered in the learning table 201 is different from the receiving port number contained in the intra-device frame header, the process proceeds to step S338.

At step S338, the L2 switch 1 updates the data (i.e., the unit number, the port number, and the trunk number) registered in the learning table 201 to the receiving unit number, the receiving port number, and the receiving trunk number contained in the intra-device frame header, respectively, on the basis of the source address.

Since it is determined at step S336 that either the unit number registered in the learning table 201 is different from the receiving unit number contained in the intra-device frame header or the port number registered in the learning table 201 is different from the receiving port number contained in the intra-device frame header, the port that receives a frame from the same source address has been changed to another port in the same trunk. Therefore, at step S339, the L2 switch 1 increments a monitoring counter (not shown), which is provided for each trunk number, by one. If the count value in the monitoring counter exceeds a predetermined value, the L2 switch 1 sets the corresponding change flag in the learning table 201 to a logical level "1" on the basis of the source address.

That is, the L2 switch 1 performs relearning at steps S338 and S339.

The frame forwarding operation between the terminal 2 and the server 4 is described next with reference to FIGS. 11 to 13.

Description is made in accordance with the following operations:

(1) Operation of receiving a frame having a broadcast destination address from the terminal 2 performed by the L2 switch 1;

(2) Operation of transmitting the frame received in operation (1) performed by the L2 switch 1;

(3) Operation of receiving a frame having a unicast destination address from the server 4 to the terminal 2 performed by the L2 switch 1;

(4) Operation of transmitting the frame received in operation (3) to the terminal 2 performed by the L2 switch 1;

(5) Operation of receiving a frame having a unicast destination address from the terminal 2 to the server 4 performed by the L2 switch 1;

(6) Operation of transmitting the frame received in operation (5) to the server 4 performed by the L2 switch 1;

(7) Operation of re-receiving a frame having a unicast destination address from the server 4 to the terminal 2 using a link different from the link used in operation (3) performed by the L2 switch 1;

(8) Operation of transmitting the frame received in operation (7) to the terminal 2 performed by the L2 switch 1 (in this operation, an operation (Example 1) in the case where data about the source address is registered in operations (1) and (2) and an operation (Example 2) in the case where data about the source address is subject to aging are described);

(9) Operation of re-receiving a frame having a unicast destination address from the terminal 2 to the server 4 performed by the L2 switch 1; and

(10) Operation of the L2 switch 1 when transmitting the frame received in operation (9) to the server 4.

Operation (1)

An operation of receiving a normal frame having a broadcast destination address from the terminal 2 via the port p1 of the line unit 13 performed by the L2 switch 1 is described with reference to FIG. 11.

At step S10, the input monitor section 111 of the line unit 13 determines whether a received frame is normal.

At step S11, the input monitor section 111 references the trunk number table 204 of its own line unit (i.e., the line unit 13) to determine whether the port (p1) that has received the normal frame is part of a link aggregation. Since the port p1 is not part of a link aggregation, the input monitor section 111 generates an intra-device frame header in which the receiving unit number, the receiving port number, and the receiving trunk number are set to "U3", "p1", and "00", respectively.

This intra-device frame header is attached to the received frame. Subsequently, the frame is transferred to the input frame forwarding section 112.

At step S12, the input frame forwarding section 112 references the destination address of the frame. In this description, since the destination address is a broadcast address, the process proceeds to step S14.

At step S14, the input frame forwarding section 112 sets information indicating that the frame is to be subject to flooding in the intra-device frame header. That is, the input frame forwarding section 112 sets a value "00" that indicates the necessity of flooding in the destination port number in the intra-device frame header. In addition, the input frame forwarding section 112 sets bits in the destination unit bitmap corresponding to all the line units 10 installed in the L2 switch 1 to a logical level "1". Additionally, since no units to be set in the trunk learning request unit bitmap are present, that is, since the trunk learning request unit bitmap in the intra-device frame header to be transmitted from the port to the back board is not used, all the bits of the trunk learning request unit bitmap are set to a logical level "0". In FIG. 5, a symbol "–" indicates the logical level "0". In addition, the L2 switch 1 has an installation table (not shown) including information about the installed line units 10. The input frame forwarding section 112 references the installation table. As noted above, the input frame forwarding section 112 updates the intra-device frame header generated by the input monitor section 111 and attached to the frame. Subsequently, the input frame forwarding section 112 transfers the intra-device frame header to the back board 1B via the intra-device signal transmitting section 113. For example, the input frame forwarding section 112 appends the frame to the intra-device frame header and transfers the frame.

The frame having the intra-device frame header and transferred to the back board 1B is transmitted to all the installed line units 10. The intra-device frame header in such a case is shown by the example F51 in FIG. 5.

Operation (2)

An operation of transmitting the frame having a broadcast destination address and received from the terminal 2 in operation (1) performed by the L2 switch 1 is described with reference to FIGS. 12 and 13.

In this description, since the frame is a broadcast frame, all the installed line units 10 perform the following operation.

Note that it is assumed that, in the learning tables 201 of the corresponding line units 10, a learning operation is not performed using the source address of the terminal 2.

At step S30, the intra-device signal receiving section 114 of the line unit 10 receives the frame having the intra-device frame header (shown by the example F51 in FIG. 5).

At step S31, the intra-device signal receiving section 114 determines whether the received frame is destined for its own line unit on the basis of the destination unit bitmap in the intra-device frame header. Note that the intra-device signal receiving section 114 recognizes the unit number of its own line unit on the basis of the installation table (not shown) in advance. In this description, since the bits of the destination unit bitmap in the intra-device frame header corresponding to all the installed line units 10 are set to a logical level "1", the process proceeds to step S33.

At step S33, the output frame forwarding section 115 registers the source address of the frame and the receiving unit number and the receiving port number contained in the intra-device frame header in the learning table 201. This operation is referred to as "learning".

The process at step S33 is described in detail next with reference to FIG. 13.

At step S331, the output frame forwarding section 115 searches the learning table 201 on the basis of the source address of the frame.

If, at step S331, it is determined that learning for the source address of the frame has not been performed, the process proceeds to step S332. At step S332, the output frame forwarding section 115 registers a source address "0A" of the frame, and a receiving unit number "U3", a receiving port number "p1", and a receiving trunk number "00" contained in the intra-device frame header in the source address, the unit number, the port number, and the trunk number in the learning table 201, respectively. The information in the learning table 201 is shown by the example F61 in FIG. 6. The information in this learning table 201 is registered in the learning tables 201 of all the installed line units 10.

Referring back to FIG. 12, the following description is made.

At step S34, the output frame forwarding section 115 references the destination port number in the intra-device frame header to determine whether the destination port number is "00" which indicates the necessity of flooding or a specific port number other than a value "00". In this description, the destination port number has been set to "00" (i.e., the necessity of flooding) at step S14 shown in FIG. 11.

At step S36, the output frame forwarding section 115 references the flooding setting table 205 and transmits the frame to the ports having the value "1" in the flooding setting table 205. In this description, the frame is forwarded from all the ports except for the port p4 of the line unit 12. The frame destined for the server 4 is forwarded from the port p4 of the line unit 11.

Operation (3)

The operation of receiving a frame having a unicast destination address from the server 4 to the terminal 2 performed by the L2 switch 1 is described next with reference to FIG. 11. In this description, the source address of the frame is "0E" and the destination address of the frame is "0A".

The server 4 is configured to have two network interface cards (NICs) providing link redundancy of two physical ports. The server 4 determines which one of the two NICs is used for transmitting a frame to the terminal 2. In this description, the server 4 transmits a frame to the port p4 of the line unit 12.

At step S10, the input monitor section 111 of the line unit 12 determines whether the received frame is normal.

At step S11, the input monitor section 111 references the trunk number table 204 of its own line unit (i.e., the line unit 12) to determine whether the port (p4) that has received the normal frame is part of a link aggregation. Since the port p4 is part of a link aggregation having a trunk number "50", the input monitor section 111 generates an intra-device frame header in which the receiving unit number, the receiving port number, and the receiving trunk number are set to "U2", "p4", and "50", respectively.

At step S12, the input frame forwarding section 112 references the destination address of the frame. In this description, since the destination address is "0A" which is a unicast address, the process proceeds to step S13.

At step S13, the input frame forwarding section 112 searches the learning table 201 on the basis of the destination address "0A" of the frame. In this description, data relating to the destination address "0A" of the frame has been registered in the learning tables 201 of all the installed line units 10 in step S332 of Operation (1). Accordingly, the process proceeds to step S15. Note that the found data when the input frame forwarding section 112 searches the learning table 201 is shown by the example F61 in FIG. 6.

At step S15, the input frame forwarding section 112 references the trunk number registered in the learning data to determine whether the trunk number has a specific trunk number. That is, if the trunk number is "00", the learning data is not registered in the learning table. However, if the trunk number is a specific value other than "00", the learning data is registered. In this description, the information registered in the learning table 201 is indicated by the example F61 in FIG. 6 and a specific trunk number is not registered. Therefore, the process proceeds to step S18.

At step S18, the input frame forwarding section 112 attaches this frame to the intra-device frame header generated on the basis of the data (F61 in FIG. 6) found at step S13. Subsequently, the input frame forwarding section 112 transfers the frame to the back board 1B via the intra-device signal transmitting section 113. In this description, the intra-device frame header is generated on the basis of the unit number "U3" and the port number "p1" in the learning data found for the source address "0A" at step S13. As shown by the example F52 in FIG. 5, the bit for the line unit 13 in the destination unit bitmap is set to a logical level "1", the destination port number is set to "p1", the receiving unit number is set to "U2", the receiving port number is set to "p4", and the receiving trunk number is set to "50".

Operation (4)

The operation performed when the L2 switch 1 transmits the unicast frame destined for the terminal 2 received from the server 4 in operation (3) to the terminal 2 is described next with reference to FIGS. 12 and 13.

Here, it is assumed that, in the learning table 201 of the corresponding the line unit 13, a learning operation has not been performed using the source address of the server 4.

At step S30, the intra-device signal receiving section 114 of the line unit 13 receives the frame having the intra-device frame header (shown by the example F52 in FIG. 5) generated at step S18 of Operation (3).

At step S31, the intra-device signal receiving section 114 determines whether the received frame is destined for its own line unit on the basis of the destination unit bitmap in the intra-device frame header. In this description, since the destination line unit is the line unit 13, this frame is discarded in the line units 11 and 12 by the process at step S32.

In this description, the line unit 13 performs the following processes.

At step S33, the output frame forwarding section 115 registers the source address of the frame, and the receiving unit number, the receiving port number, and receiving trunk number contained in the intra-device frame header in the learning table 201.

The process at step S33 is described in detail next with reference to FIG. 13.

At step S331, the output frame forwarding section 115 of the line unit 13 searches the learning table 201 on the basis of the source address of the received frame.

If, at step S331, it is determined that learning for the source address of the frame has not been performed, the process proceeds to step S332. At step S332, the output frame forwarding section 115 registers a source address "0E" of the frame, a receiving unit number "U2", a receiving port number "p4", and a receiving trunk number "50" contained in the intra-device frame header in the source address, the unit number, the port number, and the trunk number in the learning table 201, respectively. The information in the learning table 201 is shown by the example F62 in FIG. 6. The learning process is performed only by the line unit 13.

Referring back to FIG. 12, the following description is made.

At step S34, the output frame forwarding section 115 of the line unit 13 references the destination port number in the intra-device frame header to determine whether the destination port number is "00" which indicates the necessity of flooding or a specific port number other than a value "00". In this description, the destination port number has been set to a specific port number "p1" at step S18 of Operation (3).

At step S35, the output frame forwarding section 115 forwards this frame via the port p1. As a result, this frame reaches the terminal 2. When the frame is transmitted from the port, the intra-device frame header attached to the frame is removed.

Operation (5)

The operation performed when the L2 switch 1 receives a frame having a unicast destination address destined for the server 4 from the terminal 2 is described next with reference to FIG. 11. In this case, the source address of the frame is "0A" and the destination address of the frame is "0E".

Note that, in this stage, the learning table 201 of the line unit 11 contains information indicated by the example F61 in FIG. 6. The learning table 201 of the line unit 12 contains information indicated by the example F61 in FIG. 6. The learning table 201 of the line unit 13 contains information indicated by the examples F61 and F62 in FIG. 6.

At step S10, the input monitor section 111 of the line unit 13 determines whether the received frame is normal.

At step S11, the input monitor section 111 references the trunk number table 204 of its own line unit (i.e., the line unit 13) to determine whether the port (p1) that has received the normal frame is part of a link aggregation. Since the port p1 is not part of a link aggregation, the input monitor section 111 generates an intra-device frame header in which the receiving unit number, the receiving port number, and the receiving trunk number are set to "U3", "p1", and "00", respectively.

This intra-device frame header is attached to the received frame. Subsequently, the frame is transferred to the input frame forwarding section 112.

At step S12, the input frame forwarding section 112 references the destination address of the frame. In this description, since the destination address is "0E" which is a unicast address, the process proceeds to step S13.

At step S13, the input frame forwarding section 112 searches the learning table 201 on the basis of the destination address "0E" of the frame. In this description, data relating to the destination address "0E" of the frame has been registered in the learning table 201 of the line unit 13 in step S332 of Operation (4). The registered data is data shown by the examples F61 and F62 in FIG. 6.

At step S15, the input frame forwarding section 112 references the registered learning data (i.e., data indicated by the example F62) to determine whether the trunk number has been registered. That is, if the trunk number is "00", the learning data is not registered in the learning table. However, if the trunk number is a specific value other than "00", the learning data is registered. In this description, since the information registered in the learning table 201 is indicated by the example F62 in FIG. 6, the learning data is registered in the learning table of its own line unit, and therefore, a specific trunk number is registered.

At step S16, the input frame forwarding section 112 references the registered learning data to determine whether the change flag indicates a change in the receiving port of the link aggregation, that is, whether the change flag is set to a logical level "1". In this description, the registered data in the learning table 201 is data indicated by the example F62 in FIG. 6. Since the change flag is set to a logical level "0", the registered data indicates that the receiving port of the link aggregation has not been changed.

At step S17, the input frame forwarding section 112 references the port state table 202 to determine the state of the port (the unit number U1 and the port number p4) which is searched for at step S13. As noted above, the port state table 202 indicates whether a port is a target of a link aggregation and, if the port is a target of a link aggregation, whether the port is available. In this description, since the port p4 is part of a link aggregation and the state of the port p4 is normal, the process proceeds to step S18.

In this description, at step S18, the input frame forwarding section 112 determines that a link from the server 4 to the L2 switch 1 is the link to the port p4 of the line unit 12 on the basis of the data found at step S13 (i.e., data indicated by the example F62 in FIG. 6). Subsequently, to improve the reliability of the system using the L2 switch 1, the input frame forwarding section 112 determines that it forwards the frame to the server 4 using a different link in the same trunk. Thus, the input frame forwarding section 112 references the trunk member table 203 shown in FIG. 10 and selects a different port "U1p4" (the port p4 of the line unit 11). The input frame forwarding section 112 then generates an intra-device frame header on the basis of that port and attaches the frame to the generated intra-device frame header. Thereafter, the input frame forwarding section 112 transfers the frame to the back board 1B via the intra-device signal transmitting section 113. In this description, as shown by the example F53 in FIG. 5, the bit of the destination unit bitmap corresponding to the line unit 11 is set to a logical level "1", the destination port number is set to "p4", the receiving unit number is set to "U3", the receiving port number is set to "p1", and the receiving trunk number is set to "00".

Operation (6)

The operation performed when the L2 switch 1 transmits the frame having a unicast destination address and received in Operation (5) to the server 4 is described next with reference to FIGS. 12 and 13.

At step S30, the intra-device signal receiving section 114 of the line unit 11 receives the frame having the intra-device frame header generated at step S18 of Operation (5).

At step S31, the intra-device signal receiving section 114 determines whether the received frame is destined for its own line unit on the basis of the destination unit bitmap in the intra-device frame header. In this description, since the destination line unit is the line unit 11, this frame is discarded in the line units 12 and 13 by the process at step S32.

In this description, the line unit 11 performs the following processes.

At step S33, the output frame forwarding section 115 registers the source address of the frame, the receiving unit number, the receiving port number, and receiving trunk number contained in the intra-device frame header in the learning table 201.

The process at step S33 is described in detail next with reference to FIG. 13.

At step S331, the output frame forwarding section 115 of the line unit 11 searches the learning table 201 on the basis of the source address of the received frame. In this description, since the source address of the received frame is "0A" and the registered data indicated by the sample F61 in FIG. 6 is present in the learning table 201, the data that was being searching for is found.

At step S334, the output frame forwarding section 115 determines whether the trunk number registered in the learning table 201 (the trunk number "00" in the example F61 of FIG. 6) is equal to the trunk number contained in the intra-device frame header received at step S30 (the receiving trunk number "00" in the example F53 of FIG. 5). In this description, since the trunk number in the learning table 201 is "00" (not registered) and a link aggregation is not formed, the process proceeds to step S335.

At step S335, the output frame forwarding section 115 overwrites the unit number, the port number, and the trunk number in the learning table 201 corresponding to the source address. Accordingly, relearning is performs so that the registered data in the learning table 201 corresponding to the source address "0A" remains unchanged (i.e., data indicated by the sample F61 in FIG. 6).

Referring back to FIG. 12, the following description is made.

At step S34, the output frame forwarding section 115 of the line unit 11 references the destination port number in the intra-device frame header to determine whether the destination port number is "00" which indicates the necessity of flooding or a specific port number other than a value "00". In this description, the destination port number has been set to "p4" (i.e., a specific port) at step S18 of Operation (5).

The output frame forwarding section 115 forwards this frame to the server 4 via the port p4.

Operation (7)

The operation performed when the L2 switch 1 re-receives a frame having a unicast destination address from the server 4 to the terminal 2 is described with reference to FIG. 11. In this description, the source address of the frame is "0E" and the destination address of the frame is "0A".

The server 4 is configured to have two network interface cards (NICs) providing link redundancy of two physical ports. The server 4 determines which one of the two NICs is used for transmitting a frame to the terminal 2. Unlike the previous example (described with reference to Operation (3)), in this description, the server 4 transmits a frame to the port p4 of the line unit 11.

At step S10, the input monitor section 111 of the line unit 11 determines whether the received frame is normal.

At step S11, the input monitor section 111 references the trunk number table 204 of its own line unit (i.e., the line unit 11) to determine whether the port (p4) that has received the normal frame is part of a link aggregation. Since the port p4 is part of a link aggregation having a trunk number "50", the input monitor section 111 generates an intra-device frame header in which the receiving unit number, the receiving port number, and the receiving trunk number are set to "U1", "p4", and "50", respectively.

At step S12, the input frame forwarding section 112 references the destination address of the frame. In this description, since the destination address is "0A" which is a unicast address, the process proceeds to step S13.

At step S13, the input frame forwarding section 112 searches the learning table 201 on the basis of the destination address "0A" of the frame.

In this description, the subsequent steps are described with reference to the following two examples (first and second examples).

In the first example, data relating to the destination address "0A" of this frame has been registered in the learning table 201 of the line unit 11 by the process in step S332 of Operation (2).

In the second example, data relating to the destination address "0A" of this frame has been subjected to aging in the learning table 201 of the line unit 11.

FIRST EXAMPLE

If, at step S13, it is determined that a search target is registered as a result of the search operation of the learning table 201, the process proceeds to step S15. At step S15, the input frame forwarding section 112 references a trunk number in the corresponding entry of the learning table 201 to determine whether the trunk number is registered. In this description, since the registered data in the learning table 201 is data indicated by the sample F61 in FIG. 6 and the trunk number is "00", the trunk number is not registered.

At step S18, the input frame forwarding section 112 attaches this frame to the intra-device frame header generated on the basis of the data (see the example F61 in FIG. 6) found at step S13. Subsequently, the input frame forwarding section 112 transfers the intra-device frame header to the back board 1B via the intra-device signal transmitting section 113. In the intra-device frame header of this description, as shown by the example F54 in FIG. 5, the bit corresponding to the line unit 13 in the destination unit bitmap is set to a logical level "1", the destination port number is set to "p1", the receiving unit number is set to "U1", the receiving port number is set to "p4", and the receiving trunk number is set to "50".

SECOND EXAMPLE

If, at step S13, it is determined that data relating to the destination address "0A" is not registered in the learning table 201, the process proceeds to step S14. At step S14, the input frame forwarding section 112 sets information indicating that the frame is to be subject to flooding in the intra-device frame header. That is, the input frame forwarding section 112 sets the destination port number in the intra-device frame header to "00". In addition, the input frame forwarding section 112 sets the bits corresponding to all the line units 10 installed in the L2 switch 1 in the destination unit bitmap to a logical level "1". Additionally, since no units to be set in the trunk learning request unit bitmap are present, that is, since the trunk learning request unit bitmap in the intra-device frame header to be transmitted from the port to the back board is not used, all the bits of the trunk learning request unit bitmap are set to a logical level "0". In FIG. 5, a symbol "–" indicates the logical level "0". In addition, the L2 switch 1 has an installation table (not shown) including information about the installed line units 10. The input frame forwarding section 112 references the installation table. As noted above, the input frame forwarding section 112 updates the intra-device frame header generated by the input monitor section 111 and attached to the frame. Subsequently, the input frame forwarding section 112 transfers the frame having the intra-device frame header to the back board 1B via the intra-device signal transmitting section 113.

The frame having the intra-device frame header and transferred to the back board 1B is transmitted to all the installed line units 10. The intra-device frame header in such a case is shown by the example F55 in FIG. 5. The bits of the destination unit bitmap corresponding to the line units 11, 12, and 13 are set to a logical level "1", the destination port number is set to "00", the receiving unit number is set to "U1", the receiving port number is set to "p4", and the receiving trunk number is set to "50".

Operation (8)

The operation performed when the L2 switch 1 transmits the unicast frame received from the server 4 in operation (7) to the terminal 2 is described next with reference to FIGS. 12 and 13.

The following description is made with reference to the cases corresponding to the first and second examples in Operation (7).

FIRST EXAMPLE

In this example, the source address of the frame is "0E". The destination address of the frame is a unicast address of "0A". The intra-device frame header is indicated by the example F54 in FIG. 5.

At step S30, the intra-device signal receiving section 114 of the line unit 13 receives the frame having the intra-device frame header processed at step S18 of Operation (7).

At step S31, the intra-device signal receiving section 114 determines whether the received frame is destined for its own line unit on the basis of the destination unit bitmap in the intra-device frame header. In this description, since the destination line unit is the line unit 13, this frame is discarded in the line units 11 and 12 by the process at step S32.

In this description, the line unit 13 performs the following processes.

At step S33, the output frame forwarding section 115 registers the source address of the frame, the receiving unit number, the receiving port number, and receiving trunk number contained in the intra-device frame header in the learning table 201.

The process at step S33 is described in detail next with reference to FIG. 13.

At step S331, the output frame forwarding section 115 of the line unit 13 searches the learning table 201 on the basis of the source address of the received frame. In this description, the source address is "0E". The learning table 201 contains information indicated by the examples F61 and F62 shown in FIG. 6.

At step S334, the output frame forwarding section 115 determines whether the trunk number registered in the learning table 201 is equal to the trunk number contained in the intra-device frame header received at step S30. If, at step S334, it is determined that these trunk numbers are not equal, the corresponding link is part of a different link aggregation. Accordingly, at step S335, the output frame forwarding section 115 updates the unit number, the port number, and the trunk number in the learning table 201 corresponding to the source address to the receiving unit number, the receiving port number, and the receiving trunk number contained in the intra-device frame header, respectively. In this description, since the trunk number in the learning table (the example F62 in FIG. 6) has the same value "50" as the trunk number in the intra-device frame header (the example F54 in FIG. 5), the process proceeds to step S336.

At step S336, the output frame forwarding section 115 determines whether the unit number "U2" and the port number "p4" ("F62" in FIG. 6) registered in the learning table 201 are equal to the receiving unit number "U1" and the receiving port number "p4" (the example F54 in FIG. 5) contained in the intra-device frame header, respectively. In this description, the unit number in the example "F62" of FIG. 6 is different from the unit number in the example "F54", of FIG. 5.

If, at step S336, it is determined that either the unit number registered in the learning table 201 is different from the receiving unit number contained in the intra-device frame header or the port number registered in the learning table 201 is different from the receiving port number contained in the intra-device frame header or if it is determined that both the unit number registered in the learning table 201 is different from the receiving unit number contained in the intra-device frame header and the port number registered in the learning table 201 is different from the receiving port number contained in the intra-device frame header, the process proceeds to step S338. That is, if frames having the same source address are received by different ports having the same trunk number regardless of whether the ports belong to different units or the same unit, the process proceeds to step S338.

At step S338, the output frame forwarding section 115 updates the unit number "U2", the port number "p4", and the trunk number "50" registered in the learning table 201 corresponding to the source address (see the example F62 in FIG. 6) to the receiving unit number "U1", the receiving port number "p4", and the receiving trunk number "50" contained in the intra-device frame header (see the example F54 in FIG. 5), respectively. Accordingly, relearning is performed so that entry data corresponding to the source address "0E" in the learning table 201 are updated to the data indicated by the example F63 shown in FIG. 6.

Since the port that receives a frame from the same source address has been changed to another port in the same trunk at step S338, the output frame forwarding section 115, at step S339, increments a monitoring counter (not shown) for counting the number of changes for each trunk by one. If the count value in the monitoring counter exceeds a predetermined threshold value, the output frame forwarding section 115 sets the change flag in the corresponding entry of the learning table 201 to a logical level "1". In this description, it is assumed that the count value exceeds the predetermined value, and therefore, the change flag is set to a logical level "1". Accordingly, the information registered in the learning table 201 of the line unit 13 is shown by the example F63 of FIG. 6.

Referring back to FIG. 12, the following description is made.

At step S34, the output frame forwarding section 115 references the destination port number in the intra-device frame header to determine whether the destination port number is "00" which indicates the necessity of flooding or a specific port number other than a value "00". In this description, since the destination port number has been set to "p1" in step S18 of Operation (7), the process proceeds to step S35.

At step S35, the output frame forwarding section 115 forwards this frame to the terminal 2 via the port p1.

SECOND EXAMPLE

In this example, the source address of the frame is "0E". The frame has an intra-device frame header including information indicating the necessity of flooding. The information in the intra-device frame header is indicated by the example F55 in FIG. 5.

At step S30, the intra-device signal receiving section 114 of the line unit 10 receives the frame having the intra-device frame header.

At step S31, the intra-device signal receiving section 114 determines whether the received frame is destined for its own line unit on the basis of the destination unit bitmap in the intra-device frame header. Note that the intra-device signal receiving section 114 recognizes the line unit number of its own line unit on the basis of the above-described installation table (not shown).

If, at step S31, it is determined that the received frame is transmitted to its own line unit, the process proceeds to step S33. In this description, all of the installed line units 10 perform the following processing.

The output frame forwarding section 115 registers the source address of the frame and the receiving unit number and the receiving port number contained in the intra-device frame header in the learning table 201.

The process at step S33 is described in detail next with reference to FIG. 13.

At step S331, the output frame forwarding section 115 of each of the installed line units 10 searches the learning table 201 on the basis of the source address of the received frame.

If, in this description, it is determined that the learning data is deleted by aging, the process proceeds to step S332.

At step S332, the output frame forwarding section 115 registers a source address "0E" of the frame, a receiving unit number "U1", a receiving port number "p4", and a receiving trunk number "50" contained in the intra-device frame header in the learning table 201. The information in the learning table 201 is shown by the example F64 in FIG. 6. This information is registered in the learning tables 201 of all the installed line units 10.

Referring back to FIG. 12, the following description is made.

At step S34, the output frame forwarding section 115 references the destination port number in the intra-device frame header to determine whether the destination port number is "00" which indicates the necessity of flooding or a specific port number other than a value "00". In this description, the destination port number has been set to "00" (i.e., flooding) in step S14 of Operation (7).

At step S36, the output frame forwarding section 115 references the flooding setting table 205 and transmits the frame to the ports having the value "1" in the flooding setting table 205. In this description, the frame is forwarded from all the ports except for the port p4 of the line unit 12.

Operation (9)

The operation performed when the L2 switch 1 re-receives a frame having a unicast destination address of the server 4 from the terminal 2 is described next with reference to FIG. 11. In this case, the source address of the frame is "0A" and the destination address of the frame is "0E".

Note that, in this description, it is assumed that the first example of the operation (8) or (9) has been performed. In addition, it is assumed that, in operation (7), a link from the server 4 to the terminal 2 is changed from the port p4 of the line unit 12 to the port p4 of the line unit 11 in the L2 switch 1, and aging is carried out on the learning data indicated by the example F62 in FIG. 6 in the learning table 201 of the line unit 12.

That is, in this stage, the learning table 201 of the line unit 11 contains information indicated by an example F61 in FIG. 6. The learning table 201 of the line unit 12 contains no data due to the aging. The learning table 201 of the line unit 13 contains information indicated by the example F63 shown in FIG. 6.

At step S10, the input monitor section 111 of the line unit 13 determines whether the received frame is normal.

At step S11, the input monitor section 111 references the trunk number table 204 of its own line unit (i.e., the line unit 13) to determine whether the port (p1) that has received the normal frame is part of a link aggregation. Since the port p1 is not part of a link aggregation, the input monitor section 111 generates an intra-device frame header in which the receiving unit number, the receiving port number, and the receiving trunk number are set to "U3", "p1", and "00", respectively.

This intra-device frame header is attached to the received frame. Subsequently, the frame is transferred to the input frame forwarding section 112.

At step S12, the input frame forwarding section 112 references the destination address of the frame. In this case, since the destination address is "0E" which is a unicast address, the process proceeds to step S13.

At step S13, the input frame forwarding section 112 searches the learning table 201 on the basis of the destination address "0E" of the frame. In this description, data relating to the destination address "0E" of the frame has been registered in the learning table 201 of the line unit 13 in step S338 of the first example of Operation (8). The registered data is data shown by the example F63 in FIG. 6.

At step S15, the input frame forwarding section 112 references the registered learning data to determine whether the trunk number has been registered. In this description, the information registered in the learning table 201 is indicated by the example F63 in FIG. 6. That is, a trunk number "50" is registered.

At step S16, the input frame forwarding section 112 references the registered learning data to determine whether the change flag is set to a logical level "1". In this description, the registered data in the learning table 201 is data indicated by the example F63 in FIG. 6. That is, the change flag is set to a logical level "1".

At step S19, the input frame forwarding section 112 references the trunk member table 203 that indicates ports of the trunk, and selects one port from among the ports of the trunk on the basis of a predetermined computation. Subsequently, the input frame forwarding section 112 sets the destination unit bitmap and the destination port number in the intra-device frame header.

At step S20, the input frame forwarding section 112 references the trunk member table 203 to set the trunk learning request bit map in the intra-device frame header. That is, the input frame forwarding section 112 sets the bits in the trunk learning request unit bitmap corresponding to all the line units 10 forming the corresponding trunk to a logical level "1". Note that the trunk learning request unit bitmap is used for requesting the trunk learning. In this description, the bits corresponding to the line units 11 and 12 are set to a logical level "1". That is, the information indicated by the example F56 shown in FIG. 5 is set in the intra-device frame header.

Operation (10)

The operation performed when the L2 switch 1 transmits the frame having a unicast address and re-received from the terminal 2 in operation (9) is described next with reference to FIGS. 12 and 13.

At step S30, the intra-device signal receiving section 114 of the line unit 10 receives the frame having the intra-device frame header processed at step S20 of Operation (9).

At step S31, the intra-device signal receiving section 114 determines whether the received frame is destined for its own line unit 10 on the basis of the destination unit bitmap or the trunk learning request bitmap in the intra-device frame header. In this description, since the destination line unit is the line unit 11 and the trunk learning request units are the line units 11 and 12, this frame is discarded in the line unit 13 by the process at step S32.

In this description, the line units 11 and 12 perform the following processes.

At step S33, the output frame forwarding section 115 of each of the line units 11 and 12 registers the source address of the frame, the receiving unit number, the receiving port number, and receiving trunk number contained in the intra-device frame header in the learning table 201.

The process at step S33 is described in detail next with reference to FIG. 13.

The learning process of the line unit 11, which is a destination unit, is as follows.

At step S331, the output frame forwarding section 115 of the line unit 11 searches the learning table 201 on the basis of the source address of the received frame. In this description, the learning table 201 contains information indicated by the example F61 shown in FIG. 6.

At step S334, the output frame forwarding section 115 determines whether the trunk number registered in the learning table 201 is equal to the trunk number contained in the intra-device frame header received at step S30. In this description, since the trunk number in the learning table is "00", that is, since a trunk number is not set, a trunk number is not registered.

At step S335, the output frame forwarding section 115 updates the unit number, the port number, and the trunk number in the learning table 201 corresponding to the source address to the receiving unit number, the receiving port number, and the receiving trunk number contained in the intra-device frame header, respectively. In this description, relearning is performed so that data corresponding to the source address "0A" in the learning table 201 remain unchanged to be data indicated by the example F61 shown in FIG. 6.

Referring back to FIG. 12, the following description is made.

At step S34, the output frame forwarding section 115 references the destination port number in the intra-device frame header to determine whether the destination port number is "00" which indicates the necessity of flooding or a specific port number other than a value "00". In this description, since the destination port number has been set to a specific port "p4" in step S19 of Operation (9).

At step S35, the output frame forwarding section 115 forwards this frame to the server 4 via the port p4.

The learning process in the line unit 12 specified in the trunk learning request unit is as follows.

At step S331, the output frame forwarding section 115 of the line unit 12 searches the learning table 201 on the basis of the source address of the received frame. In this description, when, as described in Operation (2), the frame having a broadcast destination address is transmitted from the terminal 2, the learning process is performed at step S332. However, this learning data has been deleted by aging.

At step S332, the output frame forwarding section 115 registers, in the learning table 201, a source address "0A" of the frame, a receiving unit number "U3", and a receiving port number "p1" contained in the intra-device frame header. In this case, the learning data is the same as that shown by the example F61 in FIG. 6.

As noted above, aging is carried out on data in the learning table 201 that is not updated and relearned. In general, if the data registered in the learning table 201 is not relearned within five minutes, aging is carried out on that data. Accordingly, aging is carried out on the learning data registered by the broadcast operation performed in Operation (2). For example, as noted in the description of searching the learning table at step S13 of Operation (7), aging is carried out on the learning data of the source address "0A" in the learning table 201 of the line unit 11 or 12 unless relearning is performed on the learning data. Therefore, when the line unit 11 or 12 in which aging has been carried out receives a frame destined for the terminal 2 from the server 4 and searches the learning table 201, the corresponding data is not found, resulting in the occurrence of flooding.

In the present embodiment, if the port that receives a frame is changed to another port in the trunk, the L2 switch 1 sends a request for performing a learning process to all the line units 10 containing the ports of the trunk. Upon receiving the request for learning, the line units 10 perform a learning process. Therefore, frame forwarding without flooding caused by aging can be realized.

In addition, among ports of a link aggregation, a port used for transmitting a frame may be changed to another one due to malfunction of the port. Accordingly, it is desirable that the threshold value for setting the change flag in Operation (8) is more than or equal to two. The threshold value can be set by the setting control unit 1C in accordance with the setting information provided by a maintenance personnel.

Second Embodiment

Figure 14:
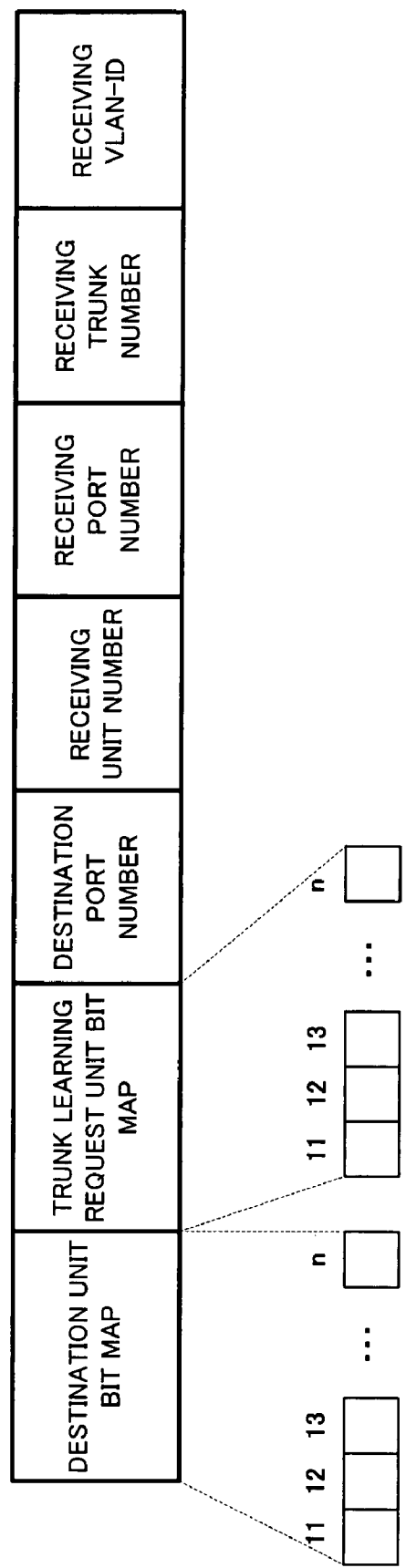
FIG. 14 illustrates a second exemplary structure of the intra-device frame header.

FIG. 14 illustrates a second exemplary structure of the intra-device frame header. In the second exemplary structure, a receiving VLAN-ID (virtual local area network-identification) is added to the first intra-device frame header. The receiving VLAN-ID is used for identifying a virtual LAN of a receiving port of a frame identified by a receiving unit number and a receiving port number.

FIG. 15 illustrates a second exemplary structure of the learning table 201. A VLAN-ID is added to the first structure of the learning table 201 shown in FIG. 6. The VLAN-ID is used for identifying a virtual LAN to which an apparatus, such as a terminal, having the corresponding source address belongs.

By using the second intra-device frame header shown in FIG. 14 and the second learning table shown in FIG. 15 in place of the first intra-device frame header shown in FIG. 5 and the first learning table shown in FIG. 6, respectively, an L2 switch having VLAN capability can forward a frame using ports having the same VLAN-ID as a group.

Consequently, like the first embodiment, according to the second embodiment, when a port for receiving a frame is changed to another port in the same trunk, learning is performed by all of the line units 10 that contain the ports of the trunk. As a result, frame forwarding without the occurrence of flooding can be realized.

What is claimed is:

1. A packet forwarding apparatus for forwarding a packet in accordance with a destination address using a trunk, the trunk combining a plurality of links connected to the packet forwarding apparatus into one link, the packet forwarding apparatus comprising:

learning means for learning a source address and a receiving path of the packet by learning information for identifying a port through which to receive the packet, information for identifying a trunk of a link connected to the port, and information for identifying that the receiving path of a packet received by the trunk has been changed;

packet forwarding means for, when a receiving path of packets having the same source address is changed in the trunk, selecting one link from among a plurality of links of the trunk in order to forward a packet having a destination address that is the same as the source address and forwarding the packet via the selected link; and learning requesting means for, when a receiving path of packets having the same source address is changed in the trunk, requesting the performance of learning for the packet having a destination address that is the same as the source address inside the packet forwarding apparatus.

2. The packet forwarding apparatus according to claim 1, further comprising:

an intra-device frame header for containing the information for identifying the trunk and information for requesting the performance of learning for the packet inside the packet forwarding apparatus;

wherein the intra-device frame header is transferred together with the received packet transferred inside the packet forwarding apparatus.

3. The packet forwarding apparatus according to claim 1, further comprising:

learning means for learning information for indicating whether the receiving path of packets having the same source address has been changed in the trunk a predetermined number of times or more;

packet forwarding means for, when the receiving path has been changed the predetermined number of times or more, selecting one link from among a plurality of links of the trunk and forwarding the packet via the selected link; and learning requesting means for, when the receiving path has been changed the predetermined number of times or more, requesting the performance of learning for the packet inside the packet forwarding apparatus.

4. The packet forwarding apparatus according to claim 3, wherein, if the receiving path has been changed less than the predetermined number of times, the packet forwarding apparatus forwards the packet on the basis of the learned information for identifying the port.

5. The packet forwarding apparatus according to claim 1, wherein, when the learning means learns the receiving path for the source address of the packet, the learning means learns an identification number of a virtual LAN to which an apparatus having the source address belongs.

6. The packet forwarding apparatus according to claim 5, further comprising:

an intra-device frame header for containing the information for identifying the trunk of the received packet, the identification number of a virtual LAN to which a port that receives the packet belongs, and information for requesting the performance of learning for the received packet inside the packet forwarding apparatus;

wherein the intra-device frame header is transferred together with the received packet transferred inside the packet forwarding apparatus.

7. A packet forwarding apparatus for forwarding a packet in accordance with a destination address using a trunk, the trunk combining a plurality of links connected to the packet forwarding apparatus into one link, the packet forwarding apparatus comprising:

at least one line unit including a plurality of ports, a learning table, a packet forwarding processing unit, and a learning request unit;

a setting control unit for controlling the at least one line unit to set a plurality of links forming the trunk; and an intra-device interface unit for connecting the at least one line unit with the setting control unit;

wherein learning results of information for identifying the port through which to receive the packet, information for identifying a trunk of a link connected to the port, and information for identifying that the receiving path of a packet received by the trunk has been changed are registered in the learning table, and wherein, when the receiving path of packets having the same source address is changed in the trunk, the packet forwarding processing unit selects one link from among a plurality of links of the trunk in order to forward a packet having a destination address that is the same as the source address and forwards the packet via the selected link, and wherein, when a receiving path of packets having the same source address is changed in the trunk, the learning requesting unit requests the performance of learning for the packet having a destination address that is the same as the source address inside the packet forwarding apparatus.

8. The packet forwarding apparatus according to claim 7, further comprising:

a learning table for learning information for indicating whether the receiving path of packets having the same source address has been changed in the trunk a predetermined number of times or more;

a packet forwarding processing unit for, when the receiving path has been changed the predetermined number of times or more, selecting one link from among a plurality of links of the trunk and forwarding the packet via the selected link; and a learning requesting unit for, when the receiving path has been changed the predetermined number of times or more, requesting the performance of learning for the packet inside the packet forwarding apparatus.

9. The packet forwarding apparatus according to claim 8, wherein, if the receiving path has been changed less than the predetermined number of times, the packet forwarding apparatus forwards the packet on the basis of the learned information for identifying the port.

10. The packet forwarding apparatus according to claim 7, wherein, when the at least one line unit learns the receiving path and the source address of the packet, the at least one line unit registers, in the learning table, the result of learning information for identifying a virtual LAN to which an apparatus having the source address belongs.

11. A method for forwarding a packet in accordance with a destination address using a trunk, the trunk combining a plurality of links connected to a packet forwarding apparatus into one link, the method comprising the steps of:

learning a source address and a receiving path of the packet by learning information for identifying a port through which to receive the packet, information for identifying a trunk of a link connected to the port, and information for identifying that the receiving path of a packet received by the trunk has been changed;

when a receiving path of packets having the same source address is changed in the trunk, selecting one link from among a plurality of links of the trunk in order to forward a packet having a destination address that is the same as the source address and forwarding the packet via the selected link; and when a receiving path of packets having the same source address is changed in the trunk, requesting the performance of learning for the packet having a destination address that is the same as the source address inside the packet forwarding apparatus.

12. The method for forwarding a packet according to claim 11, further comprising the step of:

transferring an intra-device frame header containing the information for identifying the trunk and information for requesting the performance of learning for the packet to inside the packet forwarding apparatus;

wherein the intra-device frame header is transferred together with the received packet transferred in the packet forwarding apparatus.

13. The method for forwarding a packet according to claim 11, further comprising the steps of:

learning information for indicating whether the receiving path of packets having the same source address has been changed in the trunk a predetermined number of times or more;

when the receiving path has been changed the predetermined number of times or more, selecting one link from among a plurality of links of the trunk and forwarding the packet via the selected link; and when the receiving path has been changed the predetermined number of times or more, requesting the performance of learning for the packet inside the packet forwarding apparatus.

14. The method for forwarding a packet according to claim 13, further comprising the step of:

forwarding the packet on the basis of the learned information for identifying the port if the receiving path has been changed less than the predetermined number of times.

15. The method for forwarding a packet according to claim 11, further comprising the step of:

when learning the receiving path for the source address of the packet, learning an identification number of a virtual LAN to which an apparatus having the source address belongs.

16. The method for forwarding a packet according to claim 12, further comprising the step of:

transferring an intra-device frame header containing the information for identifying the trunk, the identification number of a virtual LAN to which a port that receives the packet belongs, and information for requesting the performance of learning for the received packet to inside the packet forwarding apparatus together with a packet corresponding to the received packet transferred in the packet forwarding apparatus.

\* \* \* \* \*